United States Patent
Lin

(10) Patent No.: US 11,758,609 B2
(45) Date of Patent: *Sep. 12, 2023

(54) RADIO RESOURCE CONTROL RRC MESSAGE PROCESSING METHOD, APPARATUS, AND SYSTEM

(71) Applicant: HUAWEI TECHNOLOGIES CO., LTD., Guangdong (CN)

(72) Inventor: Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/369,503

(22) Filed: Jul. 7, 2021

(65) Prior Publication Data

US 2021/0337624 A1 Oct. 28, 2021

Related U.S. Application Data

(63) Continuation of application No. 16/446,319, filed on Jun. 19, 2019, now Pat. No. 11,076,443, which is a (Continued)

(51) Int. Cl.
*H04W 88/08* (2009.01)
*H04W 76/27* (2018.01)
(Continued)

(52) U.S. Cl.
CPC ....... *H04W 76/27* (2018.02); *H04W 36/0061* (2013.01); *H04W 36/08* (2013.01);
(Continued)

(58) Field of Classification Search
CPC . H04W 76/046; H04W 76/028; H04W 76/27; H04W 76/19; H04W 64/00; H04W 36/08; H04W 36/0061; H04W 88/08
See application file for complete search history.

(56) References Cited

U.S. PATENT DOCUMENTS

| RE41,773 E | 9/2010 | Ahmavaara et al. |
| 9,131,526 B2 | 9/2015 | Comeau et al. |
| (Continued) | | |

FOREIGN PATENT DOCUMENTS

| CN | 101174990 A | 5/2008 |
| CN | 102348244 | 2/2012 |
| (Continued) | | |

OTHER PUBLICATIONS

"Discussion on signaling load reduction," 3GPP TSG-RAN WG2 Meeting #83bis, Oct. 11, 2013, pp. 1-5 (Year: 2013).
(Continued)

*Primary Examiner* — Jamal Javaid
(74) *Attorney, Agent, or Firm* — Fish & Richardson P.C.

(57) ABSTRACT

Embodiments of the present invention relate to a radio resource control RRC message processing method, apparatus, and system. The method includes: setting up, by a first serving node, a connection to a first anchor node, and setting up, by the first anchor node, a connection to a mobility management entity MME; receiving, by the first serving node, a radio resource control RRC message sent by first user equipment UE, where the RRC message includes an RRC message carried by a signaling radio bearer SRB1 or an RRC message carried by an SRB2; and sending, by the first serving node, the RRC message to the first anchor node.

16 Claims, 12 Drawing Sheets

Related U.S. Application Data continuation of application No. 16/355,404, filed on Mar. 15, 2019, now abandoned, which is a continuation of application No. 15/493,362, filed on Apr. 21, 2017, now Pat. No. 10,257,881, which is a continuation of application No. PCT/CN2014/089300, filed on Oct. 23, 2014.

(51) Int. Cl.

| | | |
|---|---|---|
| *H04W 76/19* | (2018.01) | |
| *H04W 36/00* | (2009.01) | |
| *H04W 36/08* | (2009.01) | |
| *H04W 64/00* | (2009.01) | |
| *H04W 92/04* | (2009.01) | |
| *H04W 92/12* | (2009.01) | |
| *H04W 92/16* | (2009.01) | |
| *H04L 49/201* | (2022.01) | |
| *H04W 88/02* | (2009.01) | |

(52) U.S. Cl.
CPC ........... *H04W 64/00* (2013.01); *H04W 76/19* (2018.02); *H04W 88/08* (2013.01); *H04L 49/201* (2013.01); *H04W 88/02* (2013.01); *H04W 92/045* (2013.01); *H04W 92/12* (2013.01); *H04W 92/16* (2013.01)

(56) References Cited

U.S. PATENT DOCUMENTS

| | | | |
|---|---|---|---|
| 10,257,881 B2* | 4/2019 | Lin | H04W 76/27 |
| 11,076,443 B2* | 7/2021 | Lin | H04W 76/27 |
| 2002/0187789 A1 | 12/2002 | Diachina et al. | |
| 2010/0216469 A1* | 8/2010 | Yi | H04W 48/20 455/435.3 |
| 2011/0188408 A1 | 8/2011 | Yi et al. | |
| 2012/0176965 A1* | 7/2012 | Zhu | H04B 7/0689 370/328 |
| 2013/0010631 A1* | 1/2013 | Jung | H04W 24/02 370/252 |
| 2013/0028069 A1* | 1/2013 | Pelletier | H04W 76/15 370/216 |
| 2013/0148490 A1* | 6/2013 | Yi | H04W 76/19 370/216 |
| 2013/0165130 A1 | 6/2013 | Wu et al. | |
| 2013/0189990 A1* | 7/2013 | Kim | H04B 17/27 455/517 |
| 2013/0259003 A1 | 10/2013 | Kwon et al. | |
| 2013/0301423 A1 | 11/2013 | Sirotkin et al. | |
| 2015/0029999 A1* | 1/2015 | Horn | H04W 36/22 370/331 |
| 2015/0126154 A1 | 5/2015 | Yang | |
| 2015/0208458 A1 | 7/2015 | Pelletier et al. | |
| 2017/0332437 A1 | 11/2017 | Yamada | |

FOREIGN PATENT DOCUMENTS

| | | |
|---|---|---|
| CN | 103546928 | 1/2014 |
| EP | 2683183 | 1/2014 |
| JP | 2014524685 | 9/2014 |
| JP | 2015520564 | 7/2015 |
| JP | 2016516312 | 6/2016 |
| RU | 2488982 | 9/2009 |
| WO | 2009117443 | 9/2009 |
| WO | 2013170209 | 11/2013 |
| WO | 2013185579 | 12/2013 |
| WO | 2014126356 | 8/2014 |
| WO | 2014147929 | 9/2014 |

OTHER PUBLICATIONS

Extended European Search Report, dated Sep. 18, 2017, in European Application No. 14904298.8, 12 pages.
Huawei, HiSilicon,""Solution for Reduction of Signalling Load towards Core Network"", 3GPP TSG-RAN WG2 Meeting#83, Barcelona, Spain, R2-132853, Aug. 19-23, 2013, 4 pages.
Intel Corporation, Mobility anchor to reduce signalling load to CN without dual connectivity. 3GPP TSG RAN WG2Meeting #83 Barcelona, Spain, Aug. 19-23, 2013, R2-132857, 5 Pages.
International Search Report, dated Aug. 5, 2015, in International Application No. PCT/CN2014/089300, 4 pages.
Japanese Office Action dated Jul. 3, 2018, in corresponding Japanese Patent Application No. 2017-522096, 11 pages.
Nokia Corporation et al: ""Mobility enhancement for non-CA capable UE"", 3GPP Draft; R2-131906, No. Fukuoka; May 11, 2013, XP050700083, 2 pages.
Office Action issued in Chinese Application No. 201910426078.2 dated Feb. 12, 2020, 13 pages (with English translation).
Qualcomm Incorporated:""Completeness of Control Plane Architectures for Small Cells"", 3GPP Draft; R2-132039, No. Fukoka, Japan, May 11, 2013, XP050700132, 4 pages.
Russian Office Action dated Jul. 9, 2018 in corresponding Russian Patent Application No. 2017117578/08.
Samsung: ""Discussion on signaling load reduction"", 3GPP Draft; R2-133264, Signaling Load Reduction, No. Ljubljana, Slovenia; Sep. 27, 2013, XP050718960, 6 pages.
Extended European Search Report issued in European Application No. 21157369.6 dated Jul. 28, 2021, 13 pages.
Office Action in Chinese Appln. No. 201910426030.1, dated Feb. 10, 2023, 7 pages.

* cited by examiner

RADIO RESOURCE CONTROL RRC MESSAGE PROCESSING METHOD, APPARATUS, AND SYSTEM

CROSS-REFERENCE TO RELATED APPLICATIONS

This application is a continuation of U.S. patent application Ser. No. 16/446,319, filed on Jun. 19, 2019, which is a continuation of U.S. patent application Ser. No. 16/355,404, filed on Mar. 15, 2019, which is a continuation of U.S. patent application Ser. No. 15/493,362, filed on Apr. 21, 2017, now U.S. Pat. No. 10,257,881, which is a continuation of International Patent Application No. PCT/CN2014/089300, filed on Oct. 23, 2014. All of the afore-mentioned patent applications are hereby incorporated by reference in their entireties.

TECHNICAL FIELD

The present invention relates to the field of mobile communications, and in particular, to a radio resource control RRC message processing method, apparatus, and system.

BACKGROUND

With an increasing quantity of user equipment (UE, User Equipment), an existing wireless communications system cannot meet a wireless communication requirement of a user. Therefore, there is an urgent need to increase a system capacity of the wireless communications system. The system capacity may be increased by adding base stations. Typically, many small cells are deployed densely in a macro cell, to form more micro cells. However, most UE is connected to a base station, and the base station provides a wireless communication service for the UE. For brevity of description, a network device that provides a wireless communication service for UE is referred to as a serving node of the UE, and the serving node may be specifically a base station.

In the prior art, when UE is handed over from a cell to another cell, or when UE is handed over from a coverage area of a base station to a coverage area of another base station, or when UE finds a radio link failure (RLF, Radio Link Failure), a serving node handover may be performed on the UE, that is, the serving node of the UE is changed from a base station to another base station. Because the serving node and a mobility management entity (MME, Mobility management entity) are connected by using a control plane interface, and the serving node and a serving gateway (SGW, Serving Gateway) are connected by using a user plane interface, after the serving node handover is performed on the UE, signaling needs to be sent between a new serving node and the MME to update an S1 control plane connection between the serving node and the MME, and signaling also needs to be sent between the MME and the SGW to update an S1 user plane connection between the serving node and the SGW. Therefore, each handover process brings at least four messages. When deployment density of a base station quantity increases, a handover quantity increases sharply, and consequently, signaling load of a core network increases sharply. In addition, each serving node and the MME are connected by using a control plane interface. When the MME has a paging message to be sent, the MME sends the paging message to all base stations in a tracking area (TA, tracking area) area corresponding to the paging message. As a result, signaling load of a core network increases sharply.

SUMMARY

Embodiments of the present invention provide an RRC message processing method, apparatus, and system, so as to effectively reduce signaling load of a core network.

A first aspect provides an RRC message processing system, where the system includes a first serving node, a first anchor node, and a mobility management entity MME, the first serving node sets up a connection to the first anchor node, and the first anchor node sets up a connection to the MME;

the first serving node is configured to: receive a radio resource control RRC message sent by first user equipment UE, where the RRC message includes an RRC message carried by a signaling radio bearer SRB1 or an RRC message carried by an SRB2; and send the RRC message to the first anchor node; and the first anchor node is configured to: process, by using a first Packet Data Convergence Protocol PDCP layer entity, the RRC message carried by the SRB1 and then send a processed message to an RRC layer entity; or process, by using a second PDCP layer entity, the RRC message carried by the SRB2 and then send a processed message to the RRC layer entity.

A second aspect provides an RRC message processing apparatus, where the apparatus is disposed on a serving node, a first serving node sets up a connection to a first anchor node, and the first anchor node sets up a connection to a mobility management entity MME; and the apparatus includes:

a receiving unit, configured to receive an RRC message sent by first user equipment UE, where the RRC message includes an RRC message carried by a signaling radio bearer SRB1 or an RRC message carried by an SRB2; and a sending unit, configured to: send the RRC message received by the receiving unit to the first anchor node, so that a first Packet Data Convergence Protocol PDCP layer entity of the first anchor node processes the RRC message carried by the SRB1 and then sends a processed message to an RRC layer entity of the first anchor node, or a second PDCP layer entity of the first anchor node processes the RRC message carried by the SRB2 and then sends a processed message to an RRC layer entity of the first anchor node.

With reference to the second aspect, in a first implementation manner of the second aspect, the receiving unit is further configured to receive an RRC message sent by the first anchor node, the RRC message includes an RRC message carried by an SRB1 or an RRC message carried by an SRB2, and the apparatus further includes:

a first processing unit, configured to process, by using a first Radio Link Control RLC layer entity of the first serving node, the RRC message carried by the SRB1, so that the sending unit sends a processed message to the first UE; and a second processing unit, configured to process, by using a second RLC layer entity of the first serving node, the RRC message carried by the SRB2, so that the sending unit sends a processed message to the first UE.

With reference to the second aspect or the first implementation manner of the second aspect, in a second implementation manner of the second aspect, the apparatus further includes:

a message generation unit, configured to generate, by using an RRC layer entity of the first serving node, an RRC message carried by an SRB0, so that the sending unit sends the RRC message carried by the SRB0 to the first UE and/or the first anchor node.

With reference to the second aspect or the first implementation manner of the second aspect, in a third implementation manner of the second aspect, the RRC message further includes an RRC message carried by an SRB0; the sending unit is further configured to send first indication information to the first anchor node, where the first indication information is used by the first anchor node to identify, according to the first indication information, that the RRC message is the RRC message carried by the SRB0, and to perform processing by using the RRC layer entity of the first anchor node: and the receiving unit is further configured to receive first indication information sent by the first anchor node, where the first indication information is used by the first serving node to identify, according to the first indication information, that the RRC message is the RRC message carried by the SRB0, and to perform processing by using an RRC layer entity of the first serving node.

With reference to the second aspect or the first implementation manner of the second aspect, in a fourth implementation manner of the second aspect, the sending unit is further configured to send second indication information to the first anchor node, where the second indication information is used by the first anchor node to identify, according to the second indication information, that the RRC message is the RRC message carried by the SRB1; and the receiving unit is further configured to receive second indication information sent by the first anchor node, where the second indication information is used by the first serving node to identify, according to the second indication information, that the RRC message is the RRC message carried by the SRB1.

With reference to the second aspect or the first implementation manner of the second aspect, in a fifth implementation manner of the second aspect, the sending unit is further configured to send third indication information to the first anchor node, where the third indication information is used by the first anchor node to identify, according to the third indication information, that the RRC message is the RRC message carried by the SRB2; and the receiving unit is further configured to receive third indication information sent by the first anchor node, where the third indication information is used by the first serving node to identify, according to the third indication information, that the RRC message is the RRC message carried by the SRB2.

With reference to the second aspect, in a sixth implementation manner of the second aspect, the apparatus further includes: a first processing unit, configured to: before the sending unit sends the RRC message to the first anchor node, process, by using a first RLC layer entity of the first serving node, the RRC message carried by the SRB1; and a second processing unit, configured to: before the sending unit sends the RRC message to the first anchor node, process, by using a second RLC layer entity of the first serving node, the RRC message carried by the SRB2.

With reference to the first implementation manner of the second aspect, in a seventh implementation manner of the second aspect, the sending unit is specifically configured to: send the RRC message processed by the first processing unit to the first UE by using a Media Access Control MAC layer and a physical layer, or send the RRC message processed by the second processing unit to the first UE by using a MAC layer and a physical layer.

With reference to the first implementation manner of the second aspect, in an eighth implementation manner of the second aspect, the sending unit is specifically configured to: send the RRC message processed by the first processing unit to the first UE, so that a first PDCP layer entity of the first UE processes the RRC message carried by the SRB1 and then sends the processed message to an RRC layer entity; or send the RRC message processed by the second processing unit to the first UE, so that a second PDCP layer entity of the first UE processes the RRC message carried by the SRB2 and then sends the processed message to the RRC layer entity.

With reference to the first implementation manner of the second aspect, in a ninth implementation manner of the second aspect, the RRC message further includes an RRC message carried by an SRB0, the RRC message carried by the SRB0 is specifically an RRC connection request message or an RRC connection setup message, and the RRC message carried by the SRB1 is specifically an RRC connection setup complete message;

the receiving unit is specifically configured to receive the RRC connection request message sent by the first UE, where the RRC connection request message is an RRC connection request message that is sent by the first UE to the first serving node after the first UE receives a system message sent by means of broadcast by the first serving node, sends a random access message to the first serving node according to the system message, and receives a random access response message sent by the first serving node;

the sending unit is specifically configured to forward the RRC connection request message received by the receiving unit to the first anchor node;

the receiving unit is further configured to receive the RRC connection setup message sent by the first anchor node, where the RRC connection setup message is the RRC connection setup message generated by the first anchor node according to the received RRC connection request message;

the sending unit is further configured to send the RRC connection setup message received by the receiving unit to the first UE;

the receiving unit is further configured to receive the RRC connection setup complete message sent by the first UE; and the sending unit is further configured to send the RRC connection setup complete message received by the receiving unit to the first anchor node, to set up an RRC connection for the first anchor node and the first UE.

With reference to the first implementation manner of the second aspect, in a tenth implementation manner of the second aspect, the RRC message carried by the SRB1 is specifically an RRC connection reconfiguration message or an RRC connection reconfiguration complete message;

the sending unit is specifically configured to send a bearer addition/modification confirmation message to the first anchor node, where the bearer addition/modification confirmation message is the bearer addition/modification confirmation message that is generated by the first serving node according to a bearer addition/modification request message after the first serving node receives the bearer addition/modification request message sent by the first anchor node;

the receiving unit is specifically configured to receive the RRC connection reconfiguration message sent by the first anchor node;

the sending unit is further configured to send the RRC connection reconfiguration message received by the receiving unit to the first UE;

the receiving unit is further configured to receive the RRC connection reconfiguration complete message sent by the first UE; and the sending unit is further configured to send the RRC connection reconfiguration complete message received by the receiving unit to the first anchor node, so that the first anchor node sends a bearer addition/modification complete message to the first serving node according to the RRC connection reconfiguration complete message.

With reference to the first implementation manner of the second aspect, in an eleventh implementation manner of the second aspect, the RRC message carried by the SRB1 is specifically an RRC connection reconfiguration message or an RRC connection reconfiguration complete message;

the receiving unit is specifically configured to receive the RRC connection reconfiguration message sent by the first anchor node, where the RRC connection reconfiguration message is the RRC connection reconfiguration message that is sent by the first anchor node after the first serving node receives a bearer addition/modification request message sent by the first anchor node and sends a bearer addition/modification confirmation message to the first anchor node;

the sending unit is specifically configured to send the RRC connection reconfiguration message received by the receiving unit to the first UE;

the receiving unit is further configured to receive the RRC connection reconfiguration complete message sent by the first UE;

the sending unit is further configured to send the RRC connection reconfiguration complete message received by the receiving unit to the first anchor node; and the receiving unit is further configured to receive a bear addition/modification complete message sent by the first anchor node.

With reference to the first implementation manner of the second aspect, in a twelfth implementation manner of the second aspect, the RRC message carried by the SRB1 is specifically an RRC connection reconfiguration message;

the receiving unit is specifically configured to receive the RRC connection reconfiguration message sent by the first anchor node, where the RRC connection reconfiguration message is the RRC connection reconfiguration message that is sent by the first anchor node after a second anchor node or a neighboring base station receives a handover request message sent by the first anchor node and sends a handover request confirmation message to the first anchor node, and the first serving node belongs to the first anchor node; and the sending unit is specifically configured to send the RRC connection reconfiguration message received by the receiving unit to the first UE.

With reference to the first implementation manner of the second aspect, in a thirteenth implementation manner of the second aspect, the RRC message further includes an RRC message carried by an SRB0, the RRC message carried by the SRB0 is specifically an RRC connection re-setup request message or an RRC connection re-setup message, and the RRC message carried by the SRB1 is specifically an RRC connection re-setup complete message;

the receiving unit is specifically configured to receive the RRC connection re-setup request message sent by the first UE, where the RRC connection re-setup request message is the RRC connection re-setup request message that is sent by the first UE after the first UE finds a radio link failure RLF, receives a system message sent by means of broadcast by the first serving node, sends a random access message to the first serving node according to the system message, and receives a random access response message sent by the first serving node;

the sending unit is specifically configured to send the RRC connection re-setup request message received by the receiving unit to the first anchor node;

the receiving unit is further configured to receive the RRC connection re-setup message sent by the first anchor node;

the sending unit is further configured to send the RRC connection re-setup message received by the receiving unit to the first UE;

the receiving unit is further configured to receive the RRC connection re-setup complete message sent by the first UE; and the sending unit is further configured to send the RRC connection re-setup complete message received by the receiving unit to the first anchor node, to set up an RRC connection for the first anchor node and the first UE.

A third aspect provides an RRC message processing apparatus, where the apparatus is disposed on an anchor node, a first serving node sets up a connection to a first anchor node, the first anchor node sets up a connection to a mobility management entity MME, and the apparatus includes:

a sending unit, configured to send a radio resource control RRC message to the first serving node, where the RRC message includes an RRC message carried by a signaling radio bearer SRB1 or an RRC message carried by an SRB2.

With reference to the third aspect, in a first implementation manner of the third aspect, the apparatus further includes:

a receiving unit, configured to receive an RRC message sent by the first serving node;

a first packet data processing unit, configured to process, by using a first Packet Data Convergence Protocol PDCP layer entity of the first anchor node, an RRC message that is carried by an SRB1 and received by the receiving unit and then send a processed message to an RRC layer entity of the first anchor node; and a second packet data processing unit, configured to process, by using a second PDCP layer entity of the first anchor node, an RRC message that is carried by an SRB2 and received by the receiving unit and then send a processed message to the RRC layer entity of the first anchor node.

With reference to the third aspect or the first implementation manner of the third aspect, in a second implementation manner of the third aspect, the apparatus further includes:

a first message generation unit, configured to generate, by using the RRC layer entity of the first anchor node, the RRC message carried by the SRB1 or the RRC message carried by the SRB2, where the sending unit is specifically configured to send, to the first serving node, the RRC message that is carried by the SRB1 and generated by the first message generation unit or the RRC message that is carried by the SRB2 and generated by the first message generation unit.

With reference to the third aspect or the first implementation manner of the third aspect, in a third implementation manner of the third aspect, the RRC message further includes an RRC message carried by an SRB0, and the receiving unit is further configured to receive first indication information sent by the first serving node; and the apparatus further includes:

an identification unit, configured to: identify, according to the first indication information received by the receiving unit, that the RRC message is the RRC message carried by the SRB0, and perform processing by using the RRC layer entity of the first anchor node, where the sending unit is further configured to send first indication information to the first serving node, where the first indication information is used by the first serving node to identify, according to the first indication information, that the RRC message is the RRC message carried by the SRB0, and to perform processing by using an RRC layer entity of the first serving node.

With reference to the third aspect or the first implementation manner of the third aspect, in a fourth implementation manner of the third aspect, the receiving unit is further configured to receive second indication information sent by the first serving node; and the apparatus further includes:

an identification unit, configured to identify, according to the second indication information received by the receiving unit, that the RRC message is the RRC message carried by the SRB1, where the sending unit is further configured to send second indication information to the first serving node, where the second indication information is used by the first serving node to identify, according to the second indication information, that the RRC message is the RRC message carried by the SRB1.

With reference to the third aspect or the first implementation manner of the third aspect, in a fifth implementation manner of the third aspect, the receiving unit is further configured to receive third indication information sent by the first serving node; and the apparatus further includes:

an identification unit, configured to identify, according to the third indication information received by the receiving unit, that the RRC message is the RRC message carried by the SRB2, where the sending unit is further configured to send third indication information to the first serving node, where the third indication information is used by the first serving node to identify, according to the third indication information, that the RRC message is the RRC message carried by the SRB2.

With reference to the first implementation manner of the third aspect, in a sixth implementation manner of the third aspect, the RRC message further includes an RRC message carried by an SRB0, the RRC message carried by the SRB0 is specifically an RRC connection request message or an RRC connection setup message, and the RRC message carried by the SRB1 is specifically an RRC connection setup complete message;

the receiving unit is specifically configured to receive the RRC connection request message forwarded by the first serving node, where the RRC connection request message is an RRC connection request message that is sent by the first UE to the first serving node after the first UE receives a system message sent by means of broadcast by the first serving node, sends a random access message to the first serving node according to the system message, and receives a random access response message sent by the first serving node; and the apparatus further includes:

a second message generation unit, configured to generate the RRC connection setup message according to the RRC connection request message received by the receiving unit, where the sending unit is specifically configured to send, to the first serving node, the RRC connection setup message generated by the second message generation unit, so that the first serving node sends the RRC connection setup message to the first UE; and the receiving unit is further configured to receive the RRC connection setup complete message sent by the first serving node, to set up an RRC connection for the first anchor node and the first UE, where the RRC connection setup complete message is an RRC connection setup complete message that is sent by the first UE to the first serving node after the first UE receives the RRC connection setup message.

With reference to the first implementation manner of the third aspect, in a seventh implementation manner of the third aspect, the RRC message carried by the SRB1 is specifically an RRC connection reconfiguration message or an RRC connection reconfiguration complete message;

the receiving unit is specifically configured to receive a bearer addition/modification confirmation message sent by the first serving node, where the bearer addition/modification confirmation message is the bearer addition/modification confirmation message that is generated by the first serving node according to a bearer addition/modification request message after the first anchor node sends the bearer addition/modification request message to the first serving node;

the sending unit is specifically configured to send the RRC connection reconfiguration message to the first serving node, so that the first serving node sends the RRC connection reconfiguration message to the first UE; and the receiving unit is further configured to receive the RRC connection reconfiguration complete message sent by the first serving node, where the RRC connection reconfiguration complete message is the RRC connection reconfiguration complete message that is sent by the first UE to the first serving node after the first UE receives the RRC connection reconfiguration message, where the first anchor node sends a bearer addition/modification complete message to the first serving node according to the RRC connection reconfiguration complete message.

With reference to the first implementation manner of the third aspect, in an eighth implementation manner of the third aspect, the RRC message carried by the SRB1 is specifically an RRC connection reconfiguration message or an RRC connection reconfiguration complete message;

the sending unit is specifically configured to send the RRC connection reconfiguration message to the first serving node, where the RRC connection reconfiguration message is the RRC connection reconfiguration message that is sent by the first anchor node to the first serving node after the first anchor node sends a bearer addition/modification request message to the first serving node and receives a bearer addition/modification confirmation message sent by the first serving node;

the receiving unit is specifically configured to receive the RRC connection reconfiguration complete message sent by the first serving node, where the RRC connection reconfiguration complete message is the RRC connection reconfiguration complete message that is sent by the first UE and that is received by the first serving node after the first serving node receives the RRC connection reconfiguration message sent by the first anchor node and sends the RRC connection reconfiguration message to the first UE; and the sending unit is further configured to send a bear addition/modification complete message to the first serving node.

With reference to the first implementation manner of the third aspect, in a ninth implementation manner of the third aspect, the RRC message carried by the SRB1 is specifically an RRC connection reconfiguration message; and the sending unit is specifically configured to send the RRC connection reconfiguration message to the first serving node, so that the first serving node sends the RRC connection reconfiguration message to the first UE, where the RRC connection reconfiguration message is the RRC connection reconfiguration message that is sent by the first anchor node after a second anchor node or a neighboring base station receives a handover request message sent by the first anchor node and sends a handover request confirmation message to the first anchor node, and the first serving node belongs to the first anchor node.

With reference to the first implementation manner of the third aspect, in a tenth implementation manner of the third aspect, the RRC message further includes an RRC message carried by an SRB0, the RRC message carried by the SRB0 is specifically an RRC connection re-setup request message or an RRC connection re-setup message, and the RRC message carried by the SRB1 is specifically an RRC connection re-setup complete message;

the receiving unit is specifically configured to receive the RRC connection re-setup request message sent by the first serving node, where the RRC connection re-setup request message is the RRC connection re-setup request message that is sent by the first UE to the first serving node after the first UE finds a radio link failure RLF, receives a system message sent by means of broadcast by the first serving node, sends a random access message to the first serving node according to the system message, and receives a random access response message sent by the first serving node;

the sending unit is specifically configured to send the RRC connection re-setup message to the first serving node, so that the first serving node sends the RRC connection re-setup message to the first UE; and the receiving unit is further configured to receive the RRC connection re-setup complete message sent by the first serving node, to set up an RRC connection for the first anchor node and the first UE, where the RRC connection re-setup complete message is the RRC connection re-setup complete message that is sent by the first UE and received by the first serving node.

A fourth aspect provides a serving node, where the serving node sets up a connection to a first anchor node, and the first anchor node sets up a connection to a mobility management entity MME;

the serving node includes a transmitter and a receiver;

the receiver is configured to receive a radio resource control RRC message sent by first user equipment UE, where the RRC message includes an RRC message carried by a signaling radio bearer SRB1 or an RRC message carried by an SRB2; and the transmitter is configured to: send the RRC message received by the receiver to the first anchor node, so that a first Packet Data Convergence Protocol PDCP layer entity of the first anchor node processes the RRC message carried by the SRB1 and then sends a processed message to an RRC layer entity of the first anchor node, or a second PDCP layer entity of the first anchor node processes the RRC message carried by the SRB2 and then sends a processed message to an RRC layer entity of the first anchor node.

A fifth aspect provides an anchor node, where a first serving node sets up a connection to the anchor node, the anchor node sets up a connection to a mobility management entity MME, and the anchor includes a transmitter; and the transmitter is configured to send a radio resource control RRC message to the first serving node, where the RRC message includes an RRC message carried by a signaling radio bearer SRB1 or an RRC message carried by an SRB2.

A sixth aspect provides an RRC message processing method, where a first serving node sets up a connection to a first anchor node, and the first anchor node sets up a connection to a mobility management entity MME; and the method includes:

receiving, by the first serving node, a radio resource control RRC message sent by first user equipment UE, where the RRC message includes an RRC message carried by a signaling radio bearer SRB1 or an RRC message carried by an SRB2; and sending, by the first serving node, the RRC message to the first anchor node, so that a first Packet Data Convergence Protocol PDCP layer entity of the first anchor node processes the RRC message carried by the SRB1 and then sends a processed message to an RRC layer entity of the first anchor node, or a second PDCP layer entity of the first anchor node processes the RRC message carried by the SRB2 and then sends a processed message to an RRC layer entity of the first anchor node.

With reference to the sixth aspect, in a first implementation manner of the sixth aspect, the method further includes:

receiving, by the first serving node, an RRC message sent by the first anchor node, where the RRC message includes an RRC message carried by an SRB1 or an RRC message carried by an SRB2; and processing, by a first Radio Link Control RLC layer entity of the first serving node, the RRC message carried by the SRB1 and then sending a processed message to the first UE; or processing, by a second RLC layer entity of the first serving node, the RRC message carried by the SRB2 and then sending a processed message to the first UE.

With reference to the sixth aspect or the first implementation manner of the sixth aspect, in a second implementation manner of the sixth aspect, the method further includes: generating, by an RRC layer entity of the first serving node, an RRC message carried by an SRB0, and sending the RRC message carried by the SRB0 to the first UE and/or the first anchor node.

With reference to the sixth aspect or the first implementation manner of the sixth aspect, in a third implementation manner of the sixth aspect, the RRC message further includes an RRC message carried by an SRB0, and the method further includes: sending, by the first serving node, first indication information to the first anchor node, where the first indication information is used by the first anchor node to identify, according to the first indication information, that the RRC message is the RRC message carried by the SRB0, and to perform processing by using the RRC layer entity of the first anchor node; or receiving, by the first serving node, first indication information sent by the first anchor node, where the first indication information is used by the first serving node to identify, according to the first indication information, that the RRC message is the RRC message carried by the SRB0, and to perform processing by using an RRC layer entity of the first serving node.

With reference to the sixth aspect or the first implementation manner of the sixth aspect, in a fourth implementation manner of the sixth aspect, the method further includes: sending, by the first serving node, second indication information to the first anchor node, where the second indication information is used by the first anchor node to identify, according to the second indication information, that the RRC message is the RRC message carried by the SRB1; or receiving, by the first serving node, second indication information sent by the first anchor node, where the second indication information is used by the first serving node to identify, according to the second indication information, that the RRC message is the RRC message carried by the SRB1.

With reference to the sixth aspect or the first implementation manner of the sixth aspect, in a fifth implementation manner of the sixth aspect, the method further includes: sending, by the first serving node, third indication information to the first anchor node, where the third indication information is used by the first anchor node to identify, according to the third indication information, that the RRC message is the RRC message carried by the SRB2; or receiving, by the first serving node, third indication information sent by the first anchor node, where the third indication information is used by the first serving node to identify, according to the third indication information, that the RRC message is the RRC message carried by the SRB2.

With reference to the sixth aspect, in a sixth implementation manner of the sixth aspect, before the sending, by the first serving node, the RRC message to the first anchor node, the method further includes: processing, by a first RLC layer entity of the first serving node, the RRC message carried by the SRB1; or processing, by the second RLC layer entity, the RRC message carried by the SRB2.

With reference to the first implementation manner of the sixth aspect, in a seventh implementation manner of the sixth aspect, the processing, by a first RLC layer entity of the first serving node, the RRC message carried by the SRB1 and then sending a processed message to the first UE; or processing, by a second RLC layer entity of the first serving node, the RRC message carried by the SRB2 and then sending a processed message to the first UE includes: processing, by the first RLC layer entity of the first serving node, the RRC message carried by the SRB1 and then sending the processed message to the first UE by using a Media Access Control MAC layer and a physical layer; or processing, by the second RLC layer entity of the first serving node, the RRC message carried by the SRB2 and then sending the processed message to the first UE by using a MAC layer and a physical layer.

With reference to the first implementation manner of the sixth aspect, in an eighth implementation manner of the sixth aspect, the processing, by a first RLC layer entity of the first serving node, the RRC message carried by the SRB1 and then sending a processed message to the first UE; or processing, by a second RLC layer entity of the first serving node, the RRC message carried by the SRB2 and then sending a processed message to the first UE includes: processing, by the first RLC layer entity of the first serving node, the RRC message carried by the SRB1 and then sending the processed message to the first UE, so that a first PDCP layer entity of the first UE processes the RRC message carried by the SRB1 and then sends the processed message to an RRC layer entity; or processing, by the second RLC layer entity of the first serving node, the RRC message carried by the SRB2 and then sending the processed message to the first UE, so that a second PDCP layer entity of the first UE processes the RRC message carried by the SRB2 and then sends the processed message to the RRC layer entity.

With reference to the first implementation manner of the sixth aspect, in a ninth implementation manner of the sixth aspect, the RRC message further includes an RRC message carried by an SRB0, the RRC message carried by the SRB0 is specifically an RRC connection request message or an RRC connection setup message, and the RRC message carried by the SRB1 is specifically an RRC connection setup complete message; and the method further includes:
receiving, by the first serving node, the RRC connection request message sent by the first UE, where the RRC connection request message is an RRC connection request message that is sent by the first UE to the first serving node after the first UE receives a system message sent by means of broadcast by the first serving node, sends a random access message to the first serving node according to the system message, and receives a random access response message sent by the first serving node;

forwarding, by the first serving node, the RRC connection request message to the first anchor node;

receiving, by the first serving node, the RRC connection setup message sent by the first anchor node, where the RRC connection setup message is the RRC connection setup message generated by the first anchor node according to the received RRC connection request message;

sending, by the first serving node, the RRC connection setup message to the first UE;

receiving, by the first serving node, the RRC connection setup complete message sent by the first UE; and sending, by the first serving node, the RRC connection setup complete message to the first anchor node, to set up an RRC connection for the first anchor node and the first UE.

With reference to the first implementation manner of the sixth aspect, in a tenth implementation manner of the sixth aspect, the RRC message carried by the SRB1 is specifically an RRC connection reconfiguration message or an RRC connection reconfiguration complete message; and the method further includes;
sending, by the first serving node, a bearer addition/modification confirmation message to the first anchor node, where the bearer addition/modification confirmation message is the bearer addition/modification confirmation message that is generated by the first serving node according to a bearer addition/modification request message after the first serving node receives the bearer addition/modification request message sent by the first anchor node;

receiving the RRC connection reconfiguration message sent by the first anchor node;

sending the RRC connection reconfiguration message to the first UE;

receiving the RRC connection reconfiguration complete message sent by the first UE; and sending the RRC connection reconfiguration complete message to the first anchor node, so that the first anchor node sends a bearer addition/modification complete message to the first serving node according to the RRC connection reconfiguration complete message.

With reference to the first implementation manner of the sixth aspect, in an eleventh implementation manner of the sixth aspect, the RRC message carried by the SRB1 is specifically an RRC connection reconfiguration message or an RRC connection reconfiguration complete message; and the method further includes:
receiving, by the first serving node, the RRC connection reconfiguration message sent by the first anchor node, where the RRC connection reconfiguration message is the RRC connection reconfiguration message that is sent by the first anchor node after the first serving node receives a bearer addition/modification request message sent by the first anchor node and sends a bearer addition/modification confirmation message to the first anchor node;

sending, by the first serving node, the RRC connection reconfiguration message to the first UE;

receiving, by the first serving node, the RRC connection reconfiguration complete message sent by the first UE;

sending, by the first serving node, the RRC connection reconfiguration complete message to the first anchor node; and receiving, by the first serving node, a bear addition/modification complete message sent by the first anchor node.

With reference to the first implementation manner of the sixth aspect, in a twelfth implementation manner of the sixth aspect, the RRC message carried by the SRB1 is specifically an RRC connection reconfiguration message; and the method further includes:

receiving, by the first serving node, the RRC connection reconfiguration message sent by the first anchor node, where the RRC connection reconfiguration message is the RRC connection reconfiguration message that is sent by the first anchor node after a second anchor node or a neighboring base station receives a handover request message sent by the first anchor node and sends a handover request confirmation message to the first anchor node, and the first serving node belongs to the first anchor node; and sending, by the first serving node, the RRC connection reconfiguration message to the first UE.

With reference to the first implementation manner of the sixth aspect, in a thirteenth implementation manner of the sixth aspect, the RRC message further includes an RRC message carried by an SRB0, the RRC message carried by the SRB0 is specifically an RRC connection re-setup request message or an RRC connection re-setup message, and the RRC message carried by the SRB1 is specifically an RRC connection re-setup complete message; and the method further includes:

receiving, by the first serving node, the RRC connection re-setup request message sent by the first UE, where the RRC connection re-setup request message is the RRC connection re-setup request message that is sent by the first UE after the first UE finds a radio link failure RLF, receives a system message sent by means of broadcast by the first serving node, sends a random access message to the first serving node according to the system message, and receives a random access response message sent by the first serving node;

sending, by the first serving node, the RRC connection re-setup request message to the first anchor node;

receiving, by the first serving node, the RRC connection re-setup message sent by the first anchor node;

sending, by the first serving node, the RRC connection re-setup message to the first UE;

receiving, by the first serving node, the RRC connection re-setup complete message sent by the first UE; and sending, by the first serving node, the RRC connection re-setup complete message to the first anchor node, to set up an RRC connection for the first anchor node and the first UE.

A seventh aspect provides an RRC message processing method, where a first serving node sets up a connection to a first anchor node, the first anchor node sets up a connection to a mobility management entity MME, and the method includes:

sending, by the first anchor node, a radio resource control RRC message to the first serving node, where the RRC message includes an RRC message carried by a signaling radio bearer SRB1 or an RRC message carried by an SRB2.

With reference to the seventh aspect, in a first implementation manner of the seventh aspect, the method further includes:

receiving, by the first anchor node, an RRC message sent by the first serving node; and processing, by a first Packet Data Convergence Protocol PDCP layer entity of the first anchor node, an RRC message carried by the SRB1 and then sending a processed message to an RRC layer entity of the first anchor node; or processing, by a second PDCP layer entity of the first anchor node, an RRC message carried by the SRB2 and then sending a processed message to an RRC layer entity of the first anchor node.

With reference to the seventh aspect or the first implementation manner of the seventh aspect, in a second implementation manner of the seventh aspect, the method further includes: generating, by the RRC layer entity of the first anchor node, the RRC message carried by an SRB1 or the RRC message carried by the SRB2; and sending, to the first serving node, the RRC message carried by the SRB1 or the RRC message carried by the SRB2.

With reference to the seventh aspect or the first implementation manner of the seventh aspect, in a third implementation manner of the seventh aspect, the RRC message further includes an RRC message carried by an SRB0, and the method further includes: receiving, by the first anchor node, first indication information sent by the first serving node, where the first indication information is used by the first anchor node to identify, according to the first indication information, that the RRC message is the RRC message carried by the SRB0, and to perform processing by using the RRC layer entity of the first anchor node: or sending, by the first anchor node, first indication information to the first serving node, where the first indication information is used by the first serving node to identify, according to the first indication information, that the RRC message is the RRC message carried by the SRB0, and to perform processing by using an RRC layer entity of the first serving node.

With reference to the seventh aspect or the first implementation manner of the seventh aspect, in a fourth implementation manner of the seventh aspect, the method further includes: receiving, by the first anchor node, second indication information sent by the first serving node, where the second indication information is used by the first anchor node to identify, according to the second indication information, that the RRC message is the RRC message carried by the SRB1; or sending, by the first anchor node, second indication information to the first serving node, where the second indication information is used by the first serving node to identify, according to the second indication information, that the RRC message is the RRC message carried by the SRB1.

With reference to the seventh aspect or the first implementation manner of the seventh aspect, in a fifth implementation manner of the seventh aspect, the method further includes: receiving, by the first anchor node, third indication information sent by the first serving node, where the third indication information is used by the first anchor node to identify, according to the third indication information, that the RRC message is the RRC message carried by the SRB2; or sending, by the first anchor node, third indication information to the first serving node, where the third indication information is used by the first serving node to identify, according to the third indication information, that the RRC message is the RRC message carried by the SRB2.

With reference to the first implementation manner of the seventh aspect, in a sixth implementation manner of the seventh aspect, the RRC message further includes an RRC message carried by an SRB0, the RRC message carried by the SRB0 is specifically an RRC connection request message or an RRC connection setup message, and the RRC message carried by the SRB1 is specifically an RRC connection setup complete message; and the method further includes:

receiving, by the first anchor node, the RRC connection request message forwarded by the first serving node, where the RRC connection request message is an RRC connection request message that is sent by the first UE to the first serving node after the first UE receives a system message sent by means of broadcast by the first serving node, sends a random access message to the first serving node according to the system message, and receives a random access response message sent by the first serving node;

generating, by the first anchor node, the RRC connection setup message according to the RRC connection request message;

sending, by the first anchor node, the RRC connection setup message to the first serving node, so that the first serving node sends the RRC connection setup message to the first UE; and receiving, by the first anchor node, the RRC connection setup complete message sent by the first serving node, to set up an RRC connection for the first anchor node and the first UE, where the RRC connection setup complete message is an RRC connection setup complete message that is sent by the first UE to the first serving node after the first UE receives the RRC connection setup message.

With reference to the first implementation manner of the seventh aspect, in a seventh implementation manner of the seventh aspect, the RRC message carried by the SRB1 is specifically an RRC connection reconfiguration message or an RRC connection reconfiguration complete message; and the method further includes:

receiving, by the first anchor node, a bearer addition/modification confirmation message sent by the first serving node, where the bearer addition/modification confirmation message is the bearer addition/modification confirmation message that is generated by the first serving node according to a bearer addition/modification request message after the first anchor node sends the bearer addition/modification request message to the first serving node;

sending, by the first anchor node, the RRC connection reconfiguration message to the first serving node, so that the first serving node sends the RRC connection reconfiguration message to the first UE; and receiving, by the first anchor node, the RRC connection reconfiguration complete message sent by the first serving node, where the RRC connection reconfiguration complete message is the RRC connection reconfiguration complete message that is sent by the first UE to the first serving node after the first UE receives the RRC connection reconfiguration message; and sending, by the first anchor node, a bearer addition/modification complete message to the first serving node according to the RRC connection reconfiguration complete message.

With reference to the first implementation manner of the seventh aspect, in an eighth implementation manner of the seventh aspect, the RRC message carried by the SRB1 is specifically an RRC connection reconfiguration message or an RRC connection reconfiguration complete message; and the method further includes:

sending, by the first anchor node, the RRC connection reconfiguration message to the first serving node, where the RRC connection reconfiguration message is the RRC connection reconfiguration message that is sent by the first anchor node to the first serving node after the first anchor node sends a bearer addition/modification request message to the first serving node and receives a bearer addition/modification confirmation message sent by the first serving node;

receiving, by the first anchor node, the RRC connection reconfiguration complete message sent by the first serving node, where the RRC connection reconfiguration complete message is the RRC connection reconfiguration complete message that is sent by the first UE and that is received by the first serving node after the first serving node receives the RRC connection reconfiguration message sent by the first anchor node and sends the RRC connection reconfiguration message to the first UE; and sending, by the first anchor node, a bear addition/modification complete message to the first serving node.

With reference to the first implementation manner of the seventh aspect, in a ninth implementation manner of the seventh aspect, the RRC message carried by the SRB1 is specifically an RRC connection reconfiguration message; and the method further includes:

sending, by the first anchor node, the RRC connection reconfiguration message to the first serving node, so that the first serving node sends the RRC connection reconfiguration message to the first UE, where the RRC connection reconfiguration message is the RRC connection reconfiguration message that is sent by the first anchor node after a second anchor node or a neighboring base station receives a handover request message sent by the first anchor node and sends a handover request confirmation message to the first anchor node, and the first serving node belongs to the first anchor node.

With reference to the first implementation manner of the seventh aspect, in a tenth implementation manner of the seventh aspect, the RRC message further includes an RRC message carried by an SRB0, the RRC message carried by the SRB0 is specifically an RRC connection re-setup request message or an RRC connection re-setup message, and the RRC message carried by the SRB1 is specifically an RRC connection re-setup complete message; and the method further includes:

receiving, by the first anchor node, the RRC connection re-setup request message sent by the first serving node, where the RRC connection re-setup request message is the RRC connection re-setup request message that is sent by the first UE to the first serving node after the first UE finds a radio link failure RLF, receives a system message sent by means of broadcast by the first serving node, sends a random access message to the first serving node according to the system message, and receives a random access response message sent by the first serving node;

sending, by the first anchor node, the RRC connection re-setup message to the first serving node, so that the first serving node sends the RRC connection re-setup message to the first UE; and receiving, by the first anchor node, the RRC connection re-setup complete message sent by the first serving node, to set up an RRC connection for the first anchor node and the first UE, where the RRC connection re-setup complete message is the RRC connection re-setup complete message that is sent by the first UE and received by the first serving node.

According to the RRC message processing method, apparatus, and system provided in the embodiments of the present invention, a first serving node receives an RRC message sent by first UE or a first anchor node, and the RRC message includes an RRC message carried by an SRB1 and an RRC message carried by an SRB2. When the first serving node sends the RRC message to the first anchor node, a first PDCP layer of the first anchor node processes the RRC message carried by the SRB1 and then sends a processed message to an RRC layer entity, and a second PDCP layer processes the RRC message carried by the SRB2 and then sends a processed message to the RRC layer entity. Alternatively, a first RLC layer entity of the first serving node processes the RRC message carried by the SRB1 and then sends a processed message to the first UE, and a second RLC layer entity of the first serving node processes the RRC message carried by the SRB2 and then sends a processed message to the first UE. It may be seen from above that in the embodiments of the present invention, the first serving node and the first anchor node are used to jointly process the RRC message of the first UE, and different processing methods are used to process the RRC message according to different SRB types of the RRC message, so as to separate an RRC message processing function to two nodes, namely, the first serving node and the first anchor node. Because an MME does not set up an S1 interface connection to the serving node, when the serving node handover is performed on the UE, an RRC connection of the UE is maintained on the first anchor node, and an S1 connection between the MME and the first anchor node does not change. Therefore, the handover process causes no handover signaling. In addition, when the MME has a paging message to be sent, the MME needs to send the paging message only to all base stations in a TA area corresponding to the paging message that have the S1 interface connection to the MME or the first anchor node that is in the TA area and has the S1 interface connection to the MME. Because the MME does not set up the S1 interface connection to the serving node, the MME does not need to send the paging message to the serving node. Correspondingly, dense deployment of serving nodes does not bring signaling increase, so as to effectively reduce signaling load of a core network.

DESCRIPTION OF EMBODIMENTS

The technical solutions of the present invention are further described in detail with reference to accompanying drawings and embodiments as follows:

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

To provide thorough understanding of the present invention, the following further describes the embodiments of the present invention in detail with reference to the accompanying drawings. The foregoing embodiments are not intended to limit the protection scope of the present invention.

Figure 1:
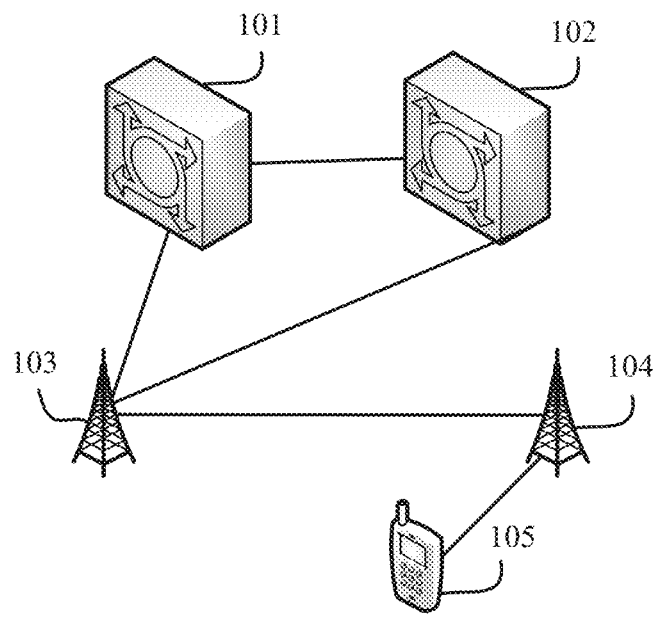
FIG. 1 is a schematic diagram of a network architecture according to an embodiment of the present invention.

FIG. 1 is a schematic diagram of a network architecture according to an embodiment of the present invention. The network architecture includes a mobility management entity (MME, Mobility management entity) 101, a serving gateway (SGW, Service Gateway) 102, an anchor node (Anchor node) 103, a serving node (Serving node) 104, and user equipment (UE, User Equipment) 105. The anchor node 103 may be an existing base station, or may be a newly added network device. The serving node 104 may be a network device that provides a wireless communication service for the UE 105, and may be specifically a base station that serves the UE 105. In the prior art, the serving node 104 directly sets up a connection to the MME 101. Different from that in the prior art, in the present invention, the serving node 104 does not directly set up a connection to the MME 101; and instead, the serving node 104 sets up a connection to the anchor node 103, and the anchor node 103 sets up a connection to the MME 101. Therefore, the serving node 104 sets up a connection to the MME 101 by using the anchor node 103. In this embodiment of the present invention, an S1-C control plane interface and an S1-U user plane interface are respectively established between the MME 101 in a core network and the anchor node 103 and between the SGW 102 in the core network and the anchor node 103. The anchor node 103 and the serving node 104 are connected by using a signal tunnel (backhaul) to establish an interface. The interface may be specifically an enhanced X2 interface, or may be an interface of another type. A radio link connection is set up between the UE 105 and the serving node 104.

In this embodiment of the present invention, the serving node 104 does not independently process RRC messages, but the anchor node 103 and the serving node 104 jointly process the RRC messages. That is, depending on types of the RRC messages, the anchor node 103 processes some RRC messages, and the serving node 104 processes remaining RRC messages, so that an RRC function is split onto the two nodes. Specifically, the anchor node 103 may include an RRC protocol entity used to process an RRC message carried by an SRB1 and an RRC protocol entity used to process an RRC message carried by an SRB2, a first Packet Data Convergence Protocol (PDCP, Packet Data Convergence Protocol) protocol entity used to process the RRC message carried by the SRB1, and a second PDCP protocol entity used to process the RRC message carried by the SRB2. Therefore, the anchor node 103 has a function of processing the RRC message carried by the SRB1 and the RRC message carried by the SRB2. That is, after receiving the RRC message carried by the SRB1 and the RRC message carried by the SRB2 that are sent by the UE 105, the serving node 104 forwards the RRC messages to the anchor node 103, and the anchor node 103 processes the received RRC message carried by the SRB1 and the received RRC message carried by the SRB2. The serving node 104 includes an RLC protocol entity used to process data carried by a data radio bearer DRB, a Media Access Control MAC protocol entity used to process the RRC message carried by the SRB1, and a physical layer PHY protocol entity used to process the RRC message carried by the SRB2, and an RRC protocol entity used to process an RRC message carried by an SRB0. The serving node 104 is configured to generate and send a common RRC message, such as a MIB, a SIB, a paging message, or MBMS control information. Therefore, the serving node 104 has a function of processing the RRC message carried by the SRB0 and is responsible for processing a system broadcast message of a BCCH service, a cell paging message of a PCCH service, and optionally, some RRC messages such as an RRC connection request message and an RRC connection setup message of a CCCH service in an RRC connection setup process and an RRC connection re-setup process of UE.

The RRC message carried by the SRB1 may be specifically an RRC message when connection setup is completed, and the RRC message carried by the SRB2 may be specifically an RRC message after connection setup is completed.

In addition, an RRC message processing procedure corresponding to the network architecture may include a processing procedure of a first type of RRC message, a processing procedure of a second type of RRC message, and a processing procedure of a third type of RRC message.

The processing procedure of the first type of RRC message is a process for processing a dedicated downlink DL RRC message of UE. The DL RRC message includes the RRC message carried by the SRB1 and the RRC message carried by the SRB2. Specifically, after generating the RRC message that is of the UE and carried by the SRB1 or the RRC message that is of the UE and carried by the SRB2, the RRC protocol entity of the anchor node 103 delivers the RRC message, for processing, to the PDCP protocol entity corresponding to the SRB1 or corresponding to the SRB2. The PDCP protocol entity of the anchor node forms a PDCP PDU, and sends the PDCP PDU to the serving node by using an interface between the anchor node and the serving node. After receiving the PDCP PDU, the serving node parses the PDCP PDU. Then, the RLC protocol entity that is of the serving node and corresponding to the SRB1 or the SRB2 processes the PDCP PDU. After the RLC protocol entity of the serving node processes the PDCP PDU, the MAC layer and the PHY layer of the serving node process a processed PDCP PDU and then sends a processed PDCP PDU to the UE.

The processing procedure of the second type of RRC message is a process for processing a dedicated uplink UL RRC message of UE. The UL RRC message includes the RRC message carried by the SRB1 and the RRC message carried by the SRB2. Specifically, after receiving the RRC message that is of the UE and carried by the SRB1 or the RRC message that is of the UE and carried by the SRB2, the serving node delivers the RRC message, for processing, to the RLC protocol entity corresponding to the SRB1 or corresponding to the SRB2. The RLC protocol entity of the serving node forms a PDCP PDU, and sends the PDCP PDU to the anchor node by using an interface between the serving node and the anchor node. After receiving the PDCP PDU, the anchor node parses the PDCP PDU. Then, the PDCP protocol entity that is of the anchor node and corresponding to the SRB1 or the SRB2 processes the PDCP PDU. The PDCP protocol entity processes the RRC message and then sends a processed message to an RRC layer entity.

The processing procedure of the third type of RRC message is a process for processing a common RRC message of UE. The common RRC message includes the RRC message carried by the SRB0. There are multiple types of common RRC messages, for example, a system broadcast message of a BCCH service, a common cell DL RRC message (a paging message or a broadcast message) served by a PCCH, and the RRC message that is carried by the SRB0 and served by a CCCH in connection setup and connection re-setup processes. The RRC message carried by the SRB0 is processed by the serving node.

The network architecture shown in FIG. 1 not only includes the serving node 104, but also includes the anchor node 103. The anchor node 103 and the serving node 104 jointly process an RRC message of the UE 105. Because the MME 101 does not set up an S1 interface connection to the serving node 104, when the serving node handover is performed on the UE 105, an RRC connection of the UE is maintained on the anchor node 103, and an S1 connection between the MME 101 and the anchor node 103 does not change. Therefore, the handover process causes no corresponding handover signaling. In addition, when the MME 101 has a to-be-sent paging message, the MME 101 needs to send the paging message only to all base stations in a TA area corresponding to the paging message that have the S1 interface connection to the MME 101 or the anchor node 103 that is in the TA area and has the S1 interface connection to the MME 101. Because the MME 101 does not set up the S1 interface connection to the serving node 104, the MME 101 does not need to send the paging message to the serving node 104. Correspondingly, dense deployment of serving nodes 104 does not bring signaling increase, so as to effectively reduce signaling load of the core network.

Figure 2:
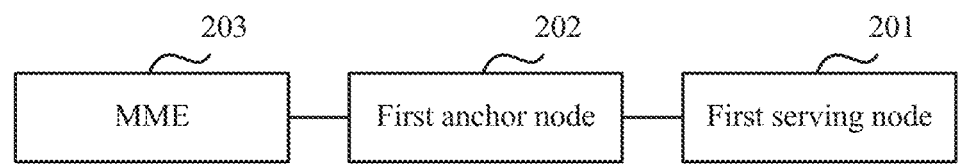
FIG. 2 is a structural diagram of an RRC message processing system according to an embodiment of the present invention.

FIG. 2 is a structural diagram of an RRC message processing system according to an embodiment of the present invention. The system includes a first serving node 201, a first anchor node 202, and a mobility management entity MME 203. The first serving node 201 sets up a connection to the first anchor node 202, and the first anchor node 202 sets up a connection to the MME 203.

The first serving node 201 is configured to: receive a radio resource control RRC message sent by first user equipment UE, where the RRC message includes an RRC message carried by a signaling radio bearer SRB1 or an RRC message carried by an SRB2; and send the RRC message to the first anchor node.

The first anchor node 202 is configured to: process, by using a first Packet Data Convergence Protocol PDCP layer entity, the RRC message carried by the SRB1 and then send a processed message to an RRC layer entity; or process, by using a second PDCP layer entity, the RRC message carried by the SRB2 and then send a processed message to the RRC layer entity.

Figure 3:
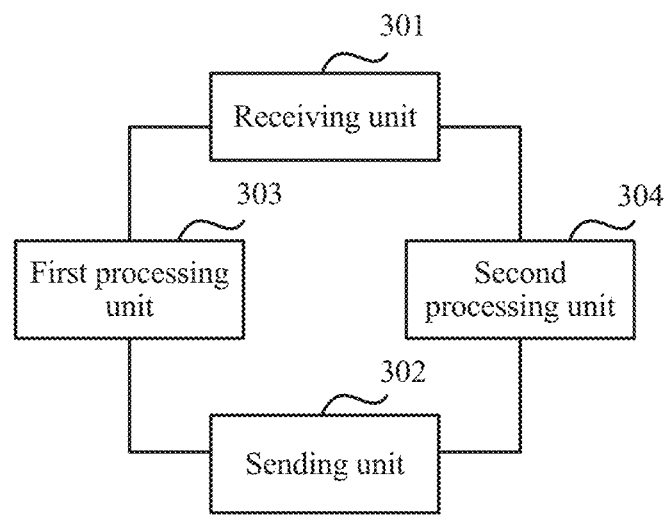
FIG. 3 is a schematic structural diagram of an RRC message processing apparatus according to an embodiment of the present invention.

FIG. 3 is a schematic structural diagram of an RRC message processing apparatus according to an embodiment of the present invention. The apparatus is disposed on a serving node. A first serving node sets up a connection to a first anchor node. The first anchor node sets up a connection to a mobility management entity MME.

The apparatus includes a receiving unit 301 and a sending unit 302.

The receiving unit 301 is configured to receive an RRC message sent by first user equipment UE. The RRC message includes an RRC message carried by a signaling radio bearer SRB1 or an RRC message carried by an SRB2.

The sending unit 302 is configured to: send the RRC message received by the receiving unit 301 to the first anchor node, so that a first Packet Data Convergence Protocol PDCP layer entity of the first anchor node processes the RRC message carried by the SRB1 and then sends a processed message to an RRC layer entity of the first anchor node, or a second PDCP layer entity of the first anchor node processes the RRC message carried by the SRB2 and then sends a processed message to an RRC layer entity of the first anchor node.

Preferably, the receiving unit 301 is further configured to receive an RRC message sent by the first anchor node. The RRC message includes an RRC message carried by an SRB1 or an RRC message carried by an SRB2. The apparatus further includes a first processing unit 303 and a second processing unit 304.

The first processing unit 303 is configured to process, by using a first Radio Link Control RLC layer entity of the first serving node, the RRC message carried by the SRB1, so that the sending unit sends a processed message to the first UE.

The second processing unit 304 is configured to process, by using a second RLC layer entity of the first serving node, the RRC message carried by the SRB2, so that the sending unit sends a processed message to the first UE.

Preferably, the apparatus further includes a message generation unit.

The message generation unit is configured to generate, by using an RRC layer entity of the first serving node, an RRC message carried by an SRB0, so that the sending unit sends the RRC message carried by the SRB0 to the first UE and/or the first anchor node.

Preferably, the RRC message further includes an RRC message carried by an SRB0. The sending unit 302 is further configured to send first indication information to the first anchor node. The first indication information is used by the first anchor node to identify, according to the first indication information, that the RRC message is the RRC message carried by the SRB0, and to perform processing by using the RRC layer entity of the first anchor node. The receiving unit 301 is further configured to receive first indication information sent by the first anchor node. The first indication information is used by the first serving node to identify, according to the first indication information, that the RRC message is the RRC message carried by the SRB0, and to perform processing by using an RRC layer entity of the first serving node.

Preferably, the sending unit 302 is further configured to send second indication information to the first anchor node. The second indication information is used by the first anchor node to identify, according to the second indication information, that the RRC message is the RRC message carried by the SRB1. The receiving unit 301 is further configured to receive second indication information sent by the first anchor node. The second indication information is used by the first serving node to identify, according to the second indication information, that the RRC message is the RRC message carried by the SRB1.

Preferably, the sending unit 302 is further configured to send third indication information to the first anchor node. The third indication information is used by the first anchor node to identify, according to the third indication information, that the RRC message is the RRC message carried by the SRB2. The receiving unit 301 is further configured to receive third indication information sent by the first anchor node. The third indication information is used by the first serving node to identify, according to the third indication information, that the RRC message is the RRC message carried by the SRB2.

Preferably, the apparatus further includes: a first processing unit 303, configured to: before the sending unit 302 sends the RRC message to the first anchor node, process, by using a first RLC layer entity of the first serving node, the RRC message carried by the SRB1: and a second processing unit 304, configured to: before the sending unit 302 sends the RRC message to the first anchor node, process, by using a second RLC layer entity of the first serving node, the RRC message carried by the SRB2.

Preferably, the sending unit 302 is specifically configured to: send the RRC message processed by the first processing unit 303 to the first UE by using a Media Access Control MAC layer and a physical layer, or send the RRC message processed by the second processing unit to the first UE by using a MAC layer and a physical layer.

Preferably, the sending unit 302 is specifically configured to: send the RRC message processed by the first processing unit 303 to the first UE, so that a first PDCP layer entity of the first UE processes the RRC message carried by the SRB1 and then sends the processed message to an RRC layer entity; or send the RRC message processed by the second processing unit 304 to the first UE, so that a second PDCP layer entity of the first UE processes the RRC message carried by the SRB2 and then sends the processed message to the RRC layer entity.

Preferably, the RRC message further includes an RRC message carried by an SRB0. The RRC message carried by the SRB0 is specifically an RRC connection request message or an RRC connection setup message. The RRC message carried by the SRB1 is specifically an RRC connection setup complete message.

The receiving unit 301 is specifically configured to receive the RRC connection request message sent by the first UE. The RRC connection request message is an RRC connection request message that is sent by the first UE to the first serving node after the first UE receives a system message sent by means of broadcast by the first serving node, sends a random access message to the first serving node according to the system message, and receives a random access response message sent by the first serving node.

The sending unit 302 is specifically configured to forward the RRC connection request message received by the receiving unit to the first anchor node.

The receiving unit 301 is further configured to receive the RRC connection setup message sent by the first anchor node. The RRC connection setup message is the RRC connection setup message generated by the first anchor node according to the received RRC connection request message.

The sending unit 302 is further configured to send the RRC connection setup message received by the receiving unit 301 to the first UE.

The receiving unit 301 is further configured to receive the RRC connection setup complete message sent by the first UE.

The sending unit 302 is further configured to send the RRC connection setup complete message received by the receiving unit 301 to the first anchor node, to set up an RRC connection for the first anchor node and the first UE.

Preferably, the RRC message carried by the SRB1 is specifically an RRC connection reconfiguration message or an RRC connection reconfiguration complete message.

The sending unit 302 is specifically configured to send a bearer addition/modification confirmation message to the first anchor node. The bearer addition/modification confirmation message is the bearer addition/modification confirmation message that is generated by the first serving node according to a bearer addition/modification request message after the first serving node receives the bearer addition/modification request message sent by the first anchor node.

The receiving unit 301 is specifically configured to receive the RRC connection reconfiguration message sent by the first anchor node.

The sending unit 302 is further configured to send the RRC connection reconfiguration message received by the receiving unit 301 to the first UE.

The receiving unit 301 is further configured to receive the RRC connection reconfiguration complete message sent by the first UE.

The sending unit 302 is further configured to send the RRC connection reconfiguration complete message received by the receiving unit 301 to the first anchor node, so that the first anchor node sends a bearer addition/modification complete message to the first serving node according to the RRC connection reconfiguration complete message.

Preferably, the RRC message carried by the SRB1 is specifically an RRC connection reconfiguration message or an RRC connection reconfiguration complete message.

The receiving unit 301 is specifically configured to receive the RRC connection reconfiguration message sent by the first anchor node. The RRC connection reconfiguration message is the RRC connection reconfiguration message that is sent by the first anchor node after the first serving node receives a bearer addition/modification request message sent by the first anchor node and sends a bearer addition/modification confirmation message to the first anchor node.

The sending unit 302 is specifically configured to send the RRC connection reconfiguration message received by the receiving unit 301 to the first UE.

The receiving unit 301 is further configured to receive the RRC connection reconfiguration complete message sent by the first UE.

The sending unit 302 is further configured to send the RRC connection reconfiguration complete message received by the receiving unit 301 to the first anchor node.

The receiving unit 301 is further configured to receive a bear addition/modification complete message sent by the first anchor node.

Preferably, the RRC message carried by the SRB1 is specifically an RRC connection reconfiguration message.

The receiving unit 301 is specifically configured to receive the RRC connection reconfiguration message sent by the first anchor node. The RRC connection reconfiguration message is the RRC connection reconfiguration message that is sent by the first anchor node after a second anchor node or a neighboring base station receives a handover request message sent by the first anchor node and sends a handover request confirmation message to the first anchor node. The first serving node belongs to the first anchor node.

The sending unit 302 is specifically configured to send the RRC connection reconfiguration message received by the receiving unit 301 to the first UE.

Preferably, the RRC message further includes an RRC message carried by an SRB0. The RRC message carried by the SRB0 is specifically an RRC connection re-setup request message or an RRC connection re-setup message. The RRC message carried by the SRB1 is specifically an RRC connection re-setup complete message.

The receiving unit 301 is specifically configured to receive the RRC connection re-setup request message sent by the first UE. The RRC connection re-setup request message is the RRC connection re-setup request message that is sent by the first UE after the first UE finds a radio link failure RLF, receives a system message sent by means of broadcast by the first serving node, sends a random access message to the first serving node according to the system message, and receives a random access response message sent by the first serving node.

The sending unit 302 is specifically configured to send the RRC connection re-setup request message received by the receiving unit 301 to the first anchor node.

The receiving unit 301 is further configured to receive the RRC connection re-setup message sent by the first anchor node.

The sending unit 302 is further configured to send the RRC connection re-setup message received by the receiving unit 301 to the first UE.

The receiving unit 301 is further configured to receive the RRC connection re-setup complete message sent by the first UE.

The sending unit 302 is further configured to send the RRC connection re-setup complete message received by the receiving unit 301 to the first anchor node, to set up an RRC connection for the first anchor node and the first UE.

Figure 4:
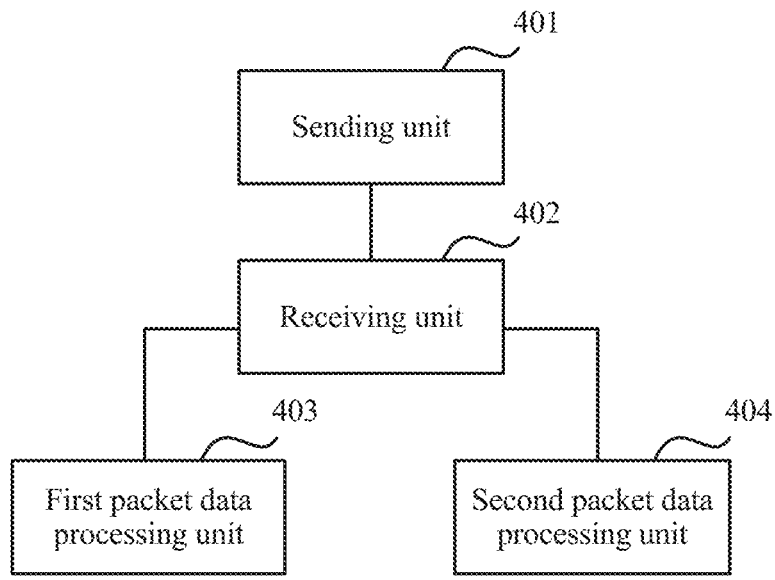
FIG. 4 is a schematic structural diagram of an RRC message processing apparatus according to an embodiment of the present invention.

FIG. 4 is a schematic structural diagram of an RRC message processing apparatus according to an embodiment of the present invention. The apparatus is disposed on an anchor node. A first serving node sets up a connection to a first anchor node. The first anchor node sets up a connection to a mobility management entity MME. The apparatus includes a sending unit 401.

The sending unit 401 is configured to send a radio resource control RRC message to the first serving node. The RRC message includes an RRC message carried by a signaling radio bearer SRB1 or an RRC message carried by an SRB2.

Preferably, the apparatus further includes a receiving unit 402, a first packet data processing unit 403, a second packet data processing unit 404.

The receiving unit 402 is configured to receive an RRC message sent by the first serving node.

The first packet data processing unit 403 is configured to process, by using a first Packet Data Convergence Protocol PDCP layer entity of the first anchor node, an RRC message that is carried by an SRB1 and received by the receiving unit 402 and then send a processed message to an RRC layer entity of the first anchor node.

The second packet data processing unit 404 is configured to process, by using a second PDCP layer entity of the first anchor node, an RRC message that is carried by an SRB2 and received by the receiving unit 402 and then send a processed message to the RRC layer entity of the first anchor node.

Preferably, the apparatus further includes a first message generation unit.

The first message generation unit is configured to generate, by using the RRC layer entity of the first anchor node, the RRC message carried by the SRB1 or the RRC message carried by the SRB2.

The sending unit is specifically configured to send, to the first serving node, the RRC message that is carried by the SRB1 and generated by the first message generation unit or the RRC message that is carried by the SRB2 and generated by the first message generation unit.

Preferably, the RRC message further includes an RRC message carried by an SRB0. The receiving unit 402 is further configured to receive first indication information sent by the first serving node.

The apparatus further includes an identification unit.

The identification unit is configured to: identify, according to the first indication information received by the receiving unit 402, that the RRC message is the RRC message carried by the SRB0, and perform processing by using the RRC layer entity of the first anchor node.

The sending unit 401 is further configured to send first indication information to the first serving node. The first indication information is used by the first serving node to identify, according to the first indication information, that the RRC message is the RRC message carried by the SRB0, and to perform processing by using an RRC layer entity of the first serving node.

Preferably, the receiving unit 402 is further configured to receive second indication information sent by the first serving node.

The apparatus further includes an identification unit.

The identification unit is configured to identify, according to the second indication information received by the receiving unit 402, that the RRC message is the RRC message carried by the SRB1.

The sending unit 401 is further configured to send second indication information to the first serving node. The second indication information is used by the first serving node to identify, according to the second indication information, that the RRC message is the RRC message carried by the SRB1.

Preferably, the receiving unit 402 is further configured to receive third indication information sent by the first serving node.

The apparatus further includes an identification unit.

The identification unit is configured to identify, according to the third indication information received by the receiving unit, that the RRC message is the RRC message carried by the SRB2.

The sending unit is further configured to send third indication information to the first serving node. The third indication information is used by the first serving node to identify, according to the third indication information, that the RRC message is the RRC message carried by the SRB2.

Preferably, the RRC message further includes an RRC message carried by an SRB0. The RRC message carried by the SRB0 is specifically an RRC connection request message or an RRC connection setup message. The RRC message carried by the SRB1 is specifically an RRC connection setup complete message.

The receiving unit 402 is specifically configured to receive the RRC connection request message forwarded by the first serving node. The RRC connection request message is an RRC connection request message that is sent by the first UE to the first serving node after the first UE receives a system message sent by means of broadcast by the first serving node, sends a random access message to the first serving node according to the system message, and receives a random access response message sent by the first serving node.

The apparatus further includes a second message generation unit.

The second message generation unit is configured to generate the RRC connection setup message according to the RRC connection request message received by the receiving unit.

The sending unit 401 is specifically configured to send, to the first serving node, the RRC connection setup message generated by the second message generation unit, so that the first serving node sends the RRC connection setup message to the first UE.

The receiving unit 402 is further configured to receive the RRC connection setup complete message sent by the first serving node, to set up an RRC connection for the first anchor node and the first UE. The RRC connection setup complete message is an RRC connection setup complete message that is sent by the first UE to the first serving node after the first UE receives the RRC connection setup message.

Preferably, the RRC message carried by the SRB1 is specifically an RRC connection reconfiguration message or an RRC connection reconfiguration complete message.

The receiving unit 402 is specifically configured to receive a bearer addition/modification confirmation message sent by the first serving node. The bearer addition/modification confirmation message is the bearer addition/modification confirmation message that is generated by the first serving node according to a bearer addition/modification request message after the first anchor node sends the bearer addition/modification request message to the first serving node.

The sending unit 401 is specifically configured to send the RRC connection reconfiguration message to the first serving node, so that the first serving node sends the RRC connection reconfiguration message to the first UE.

The receiving unit 402 is further configured to receive the RRC connection reconfiguration complete message sent by the first serving node. The RRC connection reconfiguration complete message is the RRC connection reconfiguration complete message that is sent by the first UE to the first serving node after the first UE receives the RRC connection reconfiguration message. The first anchor node sends a bearer addition/modification complete message to the first serving node according to the RRC connection reconfiguration complete message.

Preferably, the RRC message carried by the SRB1 is specifically an RRC connection reconfiguration message or an RRC connection reconfiguration complete message.

The sending unit 401 is specifically configured to send the RRC connection reconfiguration message to the first serving node. The RRC connection reconfiguration message is the RRC connection reconfiguration message that is sent by the first anchor node to the first serving node after the first anchor node sends a bearer addition/modification request message to the first serving node and receives a bearer addition/modification confirmation message sent by the first serving node.

The receiving unit 402 is specifically configured to receive the RRC connection reconfiguration complete message sent by the first serving node. The RRC connection reconfiguration complete message is the RRC connection reconfiguration complete message that is sent by the first UE and that is received by the first serving node after the first serving node receives the RRC connection reconfiguration message sent by the first anchor node and sends the RRC connection reconfiguration message to the first UE.

The sending unit 401 is further configured to send a bear addition/modification complete message to the first serving node.

Preferably, the RRC message carried by the SRB1 is specifically an RRC connection reconfiguration message.

The sending unit 401 is specifically configured to send the RRC connection reconfiguration message to the first serving node, so that the first serving node sends the RRC connection reconfiguration message to the first UE. The RRC connection reconfiguration message is the RRC connection reconfiguration message that is sent by the first anchor node after a second anchor node or a neighboring base station receives a handover request message sent by the first anchor node and sends a handover request confirmation message to the first anchor node. The first serving node belongs to the first anchor node.

Preferably, the RRC message further includes an RRC message carried by an SRB0. The RRC message carried by the SRB0 is specifically an RRC connection re-setup request message or an RRC connection re-setup message. The RRC message carried by the SRB1 is specifically an RRC connection re-setup complete message.

The receiving unit 402 is specifically configured to receive the RRC connection re-setup request message sent by the first serving node. The RRC connection re-setup request message is the RRC connection re-setup request message that is sent by the first UE to the first serving node after the first UE finds a radio link failure RLF, receives a system message sent by means of broadcast by the first serving node, sends a random access message to the first serving node according to the system message, and receives a random access response message sent by the first serving node.

The sending unit 401 is specifically configured to send the RRC connection re-setup message to the first serving node, so that the first serving node sends the RRC connection re-setup message to the first UE.

The receiving unit 402 is further configured to receive the RRC connection re-setup complete message sent by the first serving node, to set up an RRC connection for the first anchor node and the first UE. The RRC connection re-setup complete message is the RRC connection re-setup complete message that is sent by the first UE and received by the first serving node.

Figure 5:
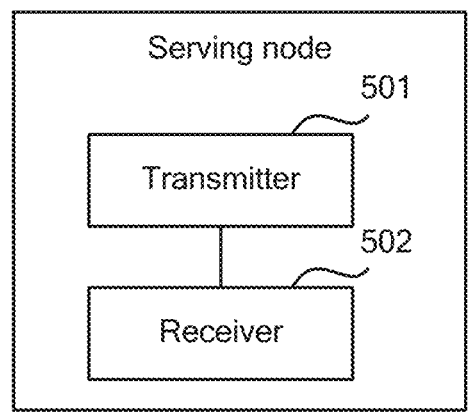
FIG. 5 is a schematic structural diagram of a serving node according to an embodiment of the present invention.

FIG. 5 is a schematic structural diagram of a serving node according to an embodiment of the present invention. The serving node sets up a connection to a first anchor node. The first anchor node sets up a connection to a mobility management entity MME.

The serving node includes a transmitter 501 and a receiver 502.

The receiver 502 is configured to receive a radio resource control RRC message sent by first user equipment UE. The RRC message includes an RRC message carried by a signaling radio bearer SRB1 or an RRC message carried by an SRB2.

The transmitter 501 is configured to: send the RRC message received by the receiver 502 to the first anchor node, so that a first Packet Data Convergence Protocol PDCP layer entity of the first anchor node processes the RRC message carried by the SRB1 and then sends a processed message to an RRC layer entity of the first anchor node, or a second PDCP layer entity of the first anchor node processes the RRC message carried by the SRB2 and then sends a processed message to an RRC layer entity of the first anchor node.

Figure 6:
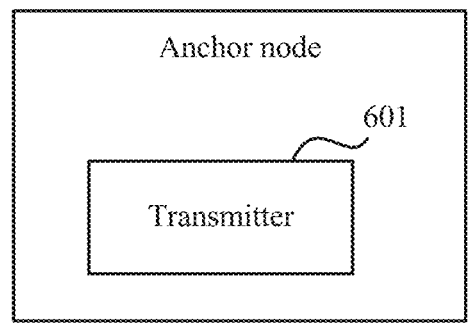
FIG. 6 is a schematic structural diagram of an anchor node according to an embodiment of the present invention.

FIG. 6 is a schematic structural diagram of an anchor node according to an embodiment of the present invention. A first serving node sets up a connection to the anchor node. The anchor node sets up a connection to a mobility management entity MME. The anchor includes a transmitter 601.

The transmitter 601 is configured to send a radio resource control RRC message to the first serving node. The RRC message includes an RRC message carried by a signaling radio bearer SRB1 or an RRC message carried by an SRB2.

Figure 7:
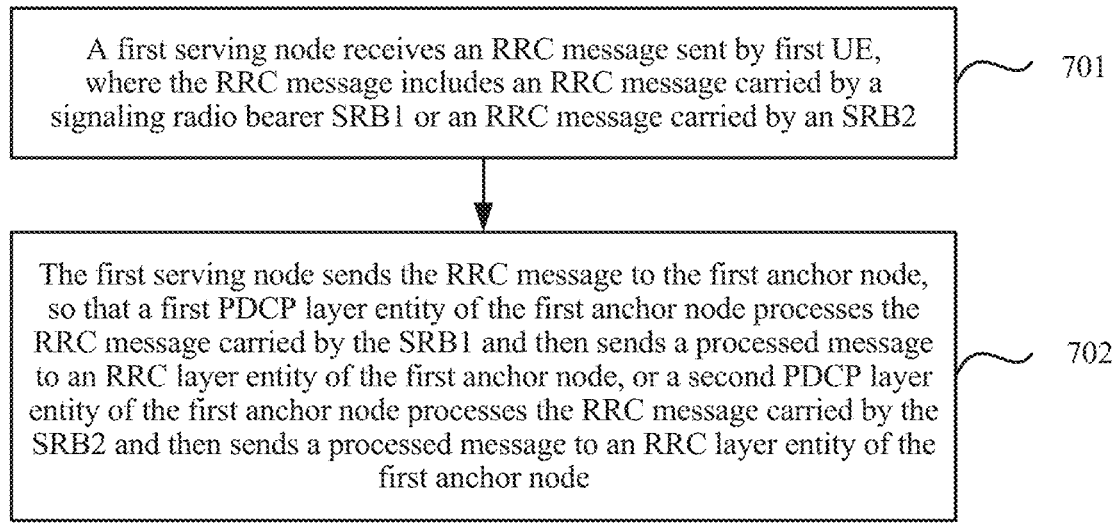
FIG. 7 is a flowchart of an RRC message processing method on a serving node side according to an embodiment of the present invention.

FIG. 7 is a flowchart of an RRC message processing method on a serving node side according to an embodiment of the present invention. The RRC message processing method is based on the network architecture shown in FIG. 1. The method is executed by a serving node. A first serving node sets up a connection to a first anchor node. The first anchor node sets up a connection to a mobility management entity MME. As shown in FIG. 7, the method specifically includes the following steps.

Step 701. The first serving node receives an RRC message sent by first UE, where the RRC message includes an RRC message carried by a signaling radio bearer SRB1 or an RRC message carried by an SRB2.

Because there are multiple UEs in a network, to distinguish between the multiple UEs, current UE is referred to as the first UE. In addition, there may also be multiple serving nodes and anchor nodes. A serving node handover may be performed on UE, that is, handing over from a serving node to another serving node. An anchor node handover may also be performed on the UE, that is, handing over from an anchor node to another anchor node. Therefore, a current serving node of the first UE is referred to as the first serving node, and a current anchor node of the first UE is referred to as the first anchor node.

An RRC message sent by the first UE or the first anchor node is not a message obtained after processing by an RRC layer entity but only content that includes an RRC PDU, for example, a PDCP PDU that is sent by the first UE or the first anchor node and that includes the RRC message carried by the SRB1 or the RRC message carried by the SRB2, or an RLC PDU that is sent by the first UE or the first anchor node and that includes an RRC message carried by an SRB0. When the RRC message is transmitted between the first serving node and the first anchor node, the PDCP PDU or the RLC PDU may also be used as an information unit and be included in another protocol message, for example, included in control plane interface signaling.

In this embodiment of the present invention, the first serving node may have an RRC function corresponding to an SRB0. The method may further include: generating, by an RRC layer entity of the first serving node, an RRC message carried by an SRB0, and sending the RRC message carried by the SRB0 to the first UE and/or the first anchor node.

The RRC function corresponding to the SRB0 may specifically include a system broadcast function, a paging function, some RRC connection setup functions, or some RRC connection re-setup functions. The some functions specifically refer to processing an RRC connection setup request message, generating and delivering an RRC connection setup message, processing an RRC connection re-setup request message, or generating and delivering an RRC connection re-setup message.

Step 702: The first serving node sends the RRC message to the first anchor node, so that a first PDCP layer entity of the first anchor node processes the RRC message carried by the SRB1 and then sends a processed message to an RRC layer entity of the first anchor node, or a second PDCP layer entity of the first anchor node processes the RRC message carried by the SRB2 and then sends a processed message to an RRC layer entity of the first anchor node.

In this embodiment of the present invention, the method may further include: receiving, by the first serving node, an RRC message sent by the first anchor node, where the RRC message includes an RRC message carried by an SRB1 or an RRC message carried by an SRB2; and processing, by a first Radio Link Control RLC layer entity of the first serving node, the RRC message carried by the SRB1 and then sending a processed message to the first UE: or processing, by a second RLC layer entity of the first serving node, the RRC message carried by the SRB2 and then sending a processed message to the first UE.

Inter-device control plane interface signaling is used between the serving node and the anchor node. Therefore, in order that the serving node and the anchor node can distinguish an SRB type of a received RRC message, a transmitter may send indication information to a receiver, and indicate the SRB type of the RRC message to the receiver by using the indication information, for example, indicate whether the RRC message is specifically an RRC message carried by the SRB1 or an RRC message carried by the SRB2. In this embodiment of the present invention, the indication information may be carried when the RRC message is being sent. Specifically, the indication information may be carried in the RRC message, or the indication information may be carried in a control plane signaling message that carries the RRC message; or the indication information may be sent independently after the RRC message is sent.

In this embodiment of the present invention, that the first PDCP layer entity of the first anchor node processes the RRC message carried by the SRB1 and then sends the processed message to the RRC layer entity specifically includes: The first PDCP layer entity of the first anchor node processes the RRC message carried by the SRB1, to obtain a PDCP PDU that includes the RRC message carried by the SRB1; and sends, to the RRC layer entity, the PDCP PDU that includes the RRC message carried by the SRB1. The PDCP PDU may be used as an information unit and be included in another protocol message, for example, included in control plane interface signaling.

In addition, the RRC message may further include an RRC message carried by an SRB0. When the RRC message sent by the first serving node to the first anchor node is specifically the RRC message carried by the SRB0, the method may further include: sending, by the first serving node, first indication information to the first anchor node, where the first indication information is used by the first anchor node to identify, according to the first indication information, that the RRC message is the RRC message carried by the SRB0, and to perform processing by using the RRC layer entity of the first anchor node: or receiving, by the first serving node, first indication information sent by the first anchor node, where the first indication information is used by the first serving node to identify, according to the first indication information, that the RRC message is the RRC message carried by the SRB0, and to perform processing by using an RRC layer entity of the first serving node.

Similarly, the first serving node may further send second indication information to the first anchor node. The second indication information is used by the first anchor node to identify, according to the second indication information, that the RRC message is the RRC message carried by the SRB1. Alternatively, the first serving node receives second indication information sent by the first anchor node. The second indication information is used by the first serving node to identify, according to the second indication information, that the RRC message is the RRC message carried by the SRB1.

Similarly, the first serving node may further send third indication information to the first anchor node. The third indication information is used by the first anchor node to identify, according to the third indication information, that the RRC message is the RRC message carried by the SRB2. Alternatively, the first serving node receives third indication information sent by the first anchor node. The third indication information is used by the first serving node to identify, according to the third indication information, that the RRC message is the RRC message carried by the SRB2.

In this embodiment of the present invention, before the first serving node sends the RRC message to the first anchor node, the method may further include: processing, by the first RLC layer entity of the first serving node, the RRC message carried by the SRB1; or processing, by the second RLC layer entity, the RRC message carried by the SRB2. Specifically, the first RLC layer entity of the first serving node processes the RRC message carried by the SRB1 to obtain an RLC PDU that includes the RRC message carried by the SRB1, or the second RLC layer entity of the first serving node processes the RRC message carried by the SRB2 to obtain an RLC PDU that includes the RRC message carried by the SRB2. The RLC PDU may be used as an information unit and be included in another protocol message, for example, included in control plane interface signaling.

In addition, the processing, by a first RLC layer entity of the first serving node, the RRC message carried by the SRB1 and then sending a processed message to the first UE; or processing, by a second RLC layer entity of the first serving node, the RRC message carried by the SRB2 and then sending a processed message to the first UE may specifically include: processing, by the first RLC layer entity of the first serving node, the RRC message carried by the SRB1 and then sending the processed message to the first UE by using a Media Access Control MAC layer and a physical layer: or processing, by the second RLC layer entity of the first serving node, the RRC message carried by the SRB2 and then sending the processed message to the first UE by using a MAC layer and a physical layer.

Alternatively, the processing, by a first RLC layer entity of the first serving node, the RRC message carried by the SRB1 and then sending a processed message to the first UE; or processing, by a second RLC layer entity of the first serving node, the RRC message carried by the SRB2 and then sending a processed message to the first UE may specifically include: processing, by the first RLC layer entity of the first serving node, the RRC message carried by the SRB1 and then sending the processed message to the first UE, so that a first PDCP layer entity of the first UE processes the RRC message carried by the SRB1 and then sends the processed message to an RRC layer entity; or processing, by the second RLC layer entity of the first serving node, the RRC message carried by the SRB2 and then sending the processed message to the first UE, so that a second PDCP layer entity of the first UE processes the RRC message carried by the SRB2 and then sends the processed message to the RRC layer entity.

It may be learned from the foregoing processing process that, in the RRC message processing method provided in this embodiment of the present invention, an RRC message cannot be directly sent between first UE and a first anchor node, and needs to be forwarded by a first serving node. That is, when the first UE needs to send an RRC message to the first anchor node, the first UE first needs to send the RRC message to the first serving node, and then the first serving node sends the RRC message to the first anchor node. When the first anchor node needs to send an RRC message to the first UE, the first anchor node first needs to send the RRC message to the first serving node, and then the first serving node sends the RRC message to the first UE. Because the RRC message needs to pass through two nodes, namely, the first anchor node and the first serving node, an RRC function can be separated to the two nodes by using the method provided in this embodiment of the present invention.

Figure 8:
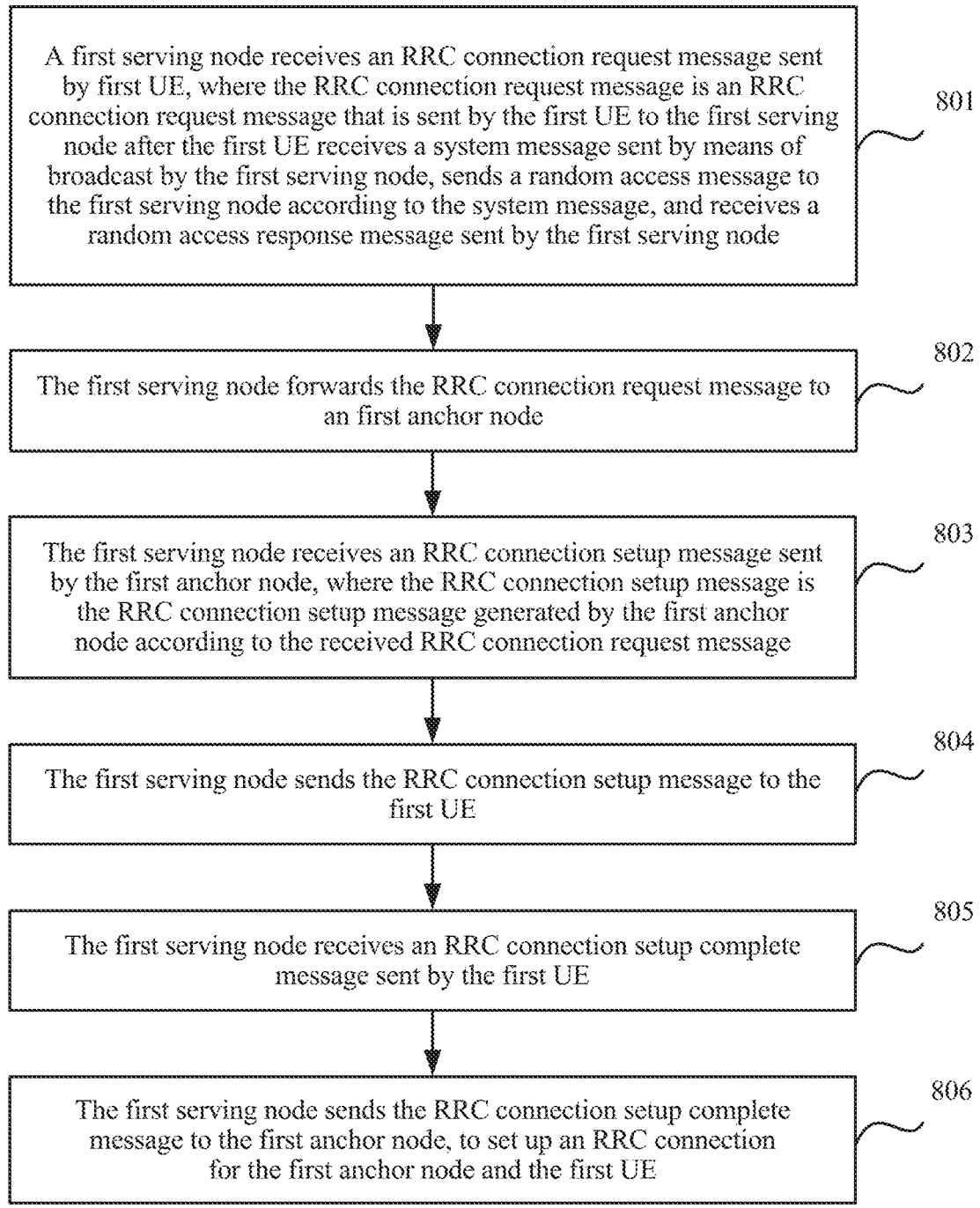
FIG. 8 is a flowchart of an RRC message processing method on a serving node side according to an embodiment of the present invention.

FIG. 8 is a flowchart of an RRC message processing method on a serving node side according to an embodiment of the present invention. The RRC message processing method is based on the network architecture shown in FIG. 1, and is specifically used to set up an RRC connection. The method is executed by a serving node. An RRC message includes an RRC message carried by an SRB1, an RRC message carried by an SRB2, and an RRC message carried by an SRB0. The RRC message carried by the SRB0 is specifically an RRC connection request message or an RRC connection setup message, and the RRC message carried by the SRB1 is specifically an RRC connection setup complete message. As shown in FIG. 8, the method specifically includes the following steps.

Step 801: A first serving node receives an RRC connection request message sent by first UE, where the RRC connection request message is an RRC connection request message that is sent by the first UE to the first serving node after the first UE receives a system message sent by means of broadcast by the first serving node, sends a random access message to the first serving node according to the system message, and receives a random access response message sent by the first serving node.

The first serving node may allocate a cell radio network temporary identifier CRNTI to the UE, and adds the CRNTI to the random access response message, to send the random access response message to the first UE.

Step 802: The first serving node forwards the RRC connection request message to a first anchor node.

In this embodiment of the present invention, the first serving node may send first indication information when forwarding the RRC connection request message to the first anchor node. The first indication information is used to indicate that the RRC connection request message is an RRC message carried by the SRB0. The first indication information may be an explicit signaling indication or a particular message name. The latter is, for example, SRB0RRCTransfer or InitialRRCTransfer. Therefore, after identifying, according to the first indication information, that the RRC connection request message is the RRC message carried by the SRB0, the first anchor node directly delivers the message to an RRC layer entity for processing.

Optionally, when forwarding the RRC connection request message to the first anchor node, the first serving node may add a CRNTI and/or an X2AP ID of the UE to the RRC connection request message. The CRNTI is carried for subsequent potential MRO optimization. For example, if a CRNTI in an RLF indication received from a neighboring cell is the same as the CRNTI, it may be determined that an RLF occurs in the UE, and the first anchor node may create UE context and an RRC connection for the UE according to the information.

Step 803: The first serving node receives an RRC connection setup message sent by the first anchor node, where the RRC connection setup message is the RRC connection setup message generated by the first anchor node according to the received RRC connection request message.

In this embodiment of the present invention, the first anchor node may add the first indication information to a message when sending the RRC connection setup message, and specifically, may add the first indication information to the RRC connection setup message or add the first indication information to a control plane signaling message that carries the RRC connection setup message. Alternatively, the first anchor node may independently send the first indication information after sending the RRC connection setup message, so that the first serving node identifies, according to the first indication information, that the RRC connection setup message is the RRC message carried by the SRB0.

Step 804: The first serving node sends the RRC connection setup message to the first UE.

Step 805: The first serving node receives an RRC connection setup complete message sent by the first UE.

In this embodiment of the present invention, the first serving node has a first RLC layer entity used to process an RRC message carried by the SRB1 and a second RLC layer entity used to process an RRC message carried by the SRB2. Because the RRC connection setup complete message is the RRC message carried by the SRB1, the first RLC layer entity of the first serving node processes the RRC connection setup complete message and then sends a processed message to the first UE.

Step 806: The first serving node sends the RRC connection setup complete message to the first anchor node, to set up an RRC connection for the first anchor node and the first UE.

The first serving node may add second indication information to a message when sending the RRC connection setup complete message to the first anchor node, and specifically, may add the second indication information to the RRC connection setup complete message or add the second indication information to a control plane signaling message that carries the RRC connection setup complete message. Alternatively, the first serving node may independently send the second indication information after sending the RRC connection setup complete message, so that the first anchor node identifies, according to the second indication information, that the RRC connection setup complete message is the RRC message carried by the SRB1. Then, the RRC connection setup complete message is processed at a first PDCP layer of the first anchor node, and then a processed message is sent to the RRC layer entity.

In addition, after the RRC connection is set up between the first anchor node and the first UE, in a subsequent uplink/downlink RRC message processing process, the first serving node may forward, to the first anchor node, a PDCP PDU corresponding to an RRC message that is carried by the SRB1 and received from the first UE and a PDCP PDU corresponding to an RRC message that is carried by the SRB2 and received from the first UE. After a PDCP entity of the SRB1 and a PDCP entity of the SRB2 respectively process the RRC messages, the first anchor node may deliver processed messages to the RRC layer entity. In addition, the first serving node delivers, respectively to an RLC entity of the SRB1 and an RLC entity of the SRB2 for processing, a PDCP PDU corresponding to an RRC message that is carried by the SRB1 and received from the first anchor node and a PDCP PDU corresponding to an RRC message that is carried by the SRB2 and received from the first anchor node, and then sends processed messages to the first UE by using a MAC layer and a physical layer. Each time an RRC message is sent between the first anchor node and the first serving node, whether the RRC message is an RRC message carried by an SRB0, an RRC message carried by an SRB1, or an RRC message carried by an SRB2 needs to be indicated, so that a receiver performs processing.

It may be learned from the foregoing processing process that, in the RRC message processing method provided in this embodiment of the present invention, an RRC connection may be set up for a first anchor node and first UE. In addition, in a process of setting up the RRC connection, for an RRC message between a first serving node and the first anchor node, indication information used to indicate an SRB type may be carried when the RRC message is being sent, or the indication information may be independently sent, so that the first serving node and the first anchor node perform corresponding processing. Therefore, an RRC function is separated to two nodes, namely, the first serving node and the first anchor node.

Figure 9:
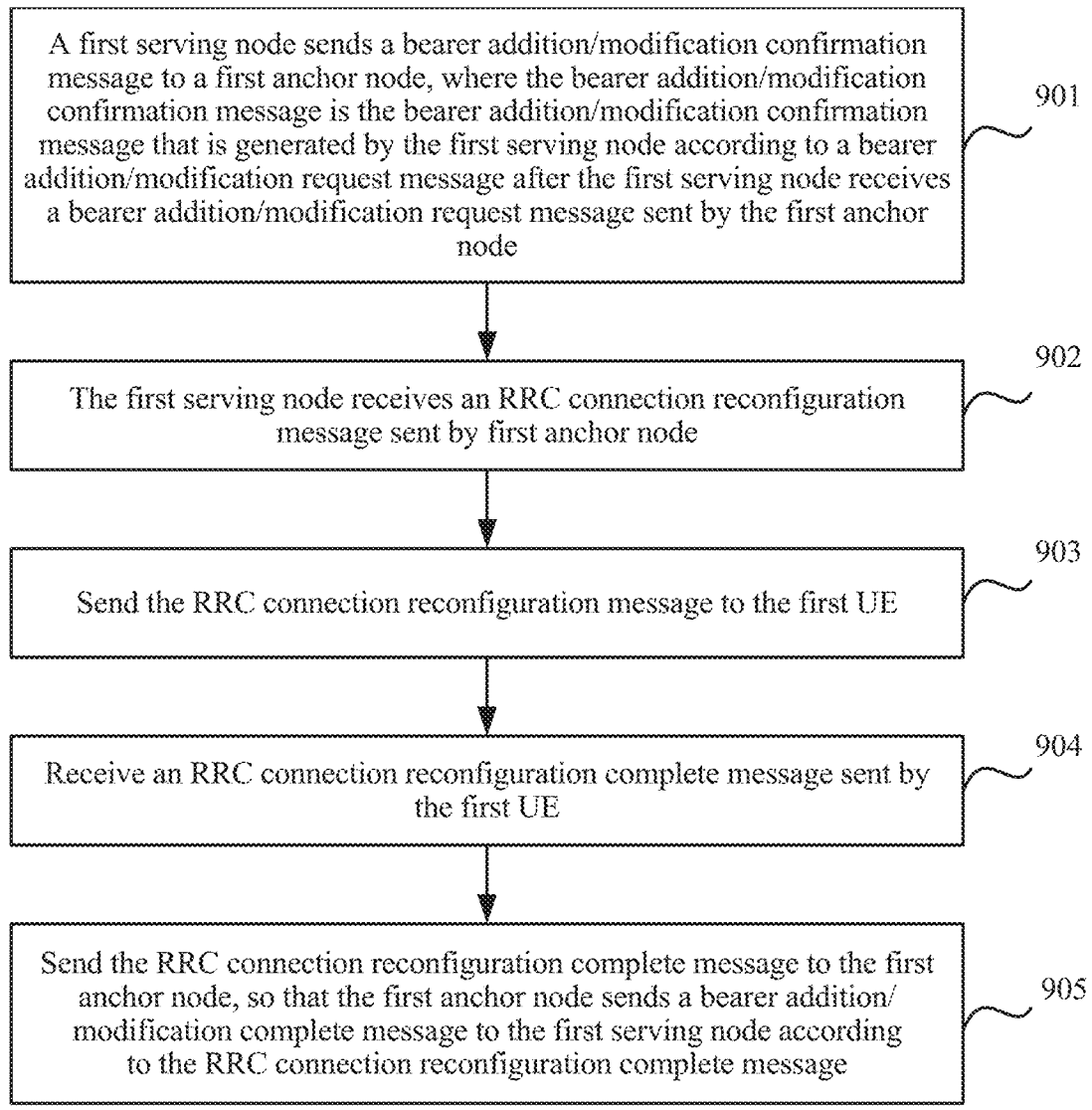
FIG. 9 is a flowchart of an RRC message processing method on a serving node side according to an embodiment of the present invention.

FIG. 9 is a flowchart of an RRC message processing method on a serving node side according to an embodiment of the present invention. The RRC message processing method is based on the network architecture shown in FIG. 1, and is specifically used to set up a DRB bearer. The method is executed by a serving node. The RRC message includes an RRC message carried by an SRB1. The RRC message carried by the SRB1 is specifically an RRC connection reconfiguration message or an RRC connection reconfiguration complete message. As shown in FIG. 9, the method specifically includes the following steps.

Step 901: A first serving node sends a bearer addition/modification confirmation message to a first anchor node, where the bearer addition/modification confirmation message is the bearer addition/modification confirmation message that is generated by the first serving node according to a bearer addition/modification request message after the first serving node receives the bearer addition/modification request message sent by the first anchor node.

In this embodiment of the present invention, after receiving an RRC connection setup complete message sent by first UE, the first anchor node may send initial UE information to an MME, receive an initial environment setup request message or an E-RAB setup request message that is sent by the MME, and send the bearer addition/modification request message to the first serving node.

E-RAB is short for E-UTRAN radio access bearer, E-UTRAN is short for evolved UTRAN, UTRAN is short for UMTS Terrestrial Radio Access Network, and RAB is short for radio access bearer, radio access bearer.

Step 902: The first serving node receives an RRC connection reconfiguration message sent by the first anchor node.

The first serving node may further receive second indication information, so that the first serving node identifies, according to the second indication information, that the RRC connection reconfiguration message is an RRC message carried by an SRB1. A first RLC layer entity of the first serving node processes the RRC message carried by the SRB1.

Step 903: Send the RRC connection reconfiguration message to first UE.

In this embodiment of the present invention, specifically, the first RLC layer entity of the first serving node may process the RRC message carried by the SRB1 and then send a processed message to the first UE by using a MAC layer and a physical layer.

Step 904: Receive the RRC connection reconfiguration complete message sent by the first UE.

Step 905. Send the RRC connection reconfiguration complete message to the first anchor node, so that the first anchor node sends a bearer addition/modification complete message to the first serving node according to the RRC connection reconfiguration complete message.

The second indication information may be carried when the RRC connection reconfiguration complete message is being sent. Specifically, the second indication information may be carried in the RRC connection reconfiguration complete message, or the second indication information may be carried in a control plane signaling message that carries the RRC connection reconfiguration complete message. Alternatively, the second indication information may be independently sent after the RRC connection reconfiguration complete message is sent, so that the first anchor node identifies, according to the second indication information, that the RRC connection reconfiguration message is the RRC message carried by the SRB1. A first PDCP layer entity of the first anchor node processes the RRC message carried by the SRB1 and then sends a processed message to an RRC layer entity. Preferably, the second indication information is carried in the control plane signaling message.

It may be learned from the foregoing processing process that, in the RRC message processing method provided in this embodiment of the present invention, a DRB bearer may be set up. In addition, in a process of setting up the DRB bearer, for an RRC message between a first serving node and a first anchor node, indication information used to indicate an SRB type may be carried when the RRC message is being sent, or the indication information may be independently sent, so that the first serving node and the first anchor node perform corresponding processing. Therefore, an RRC function is separated to two nodes, namely, the first serving node and the first anchor node.

Figure 10:
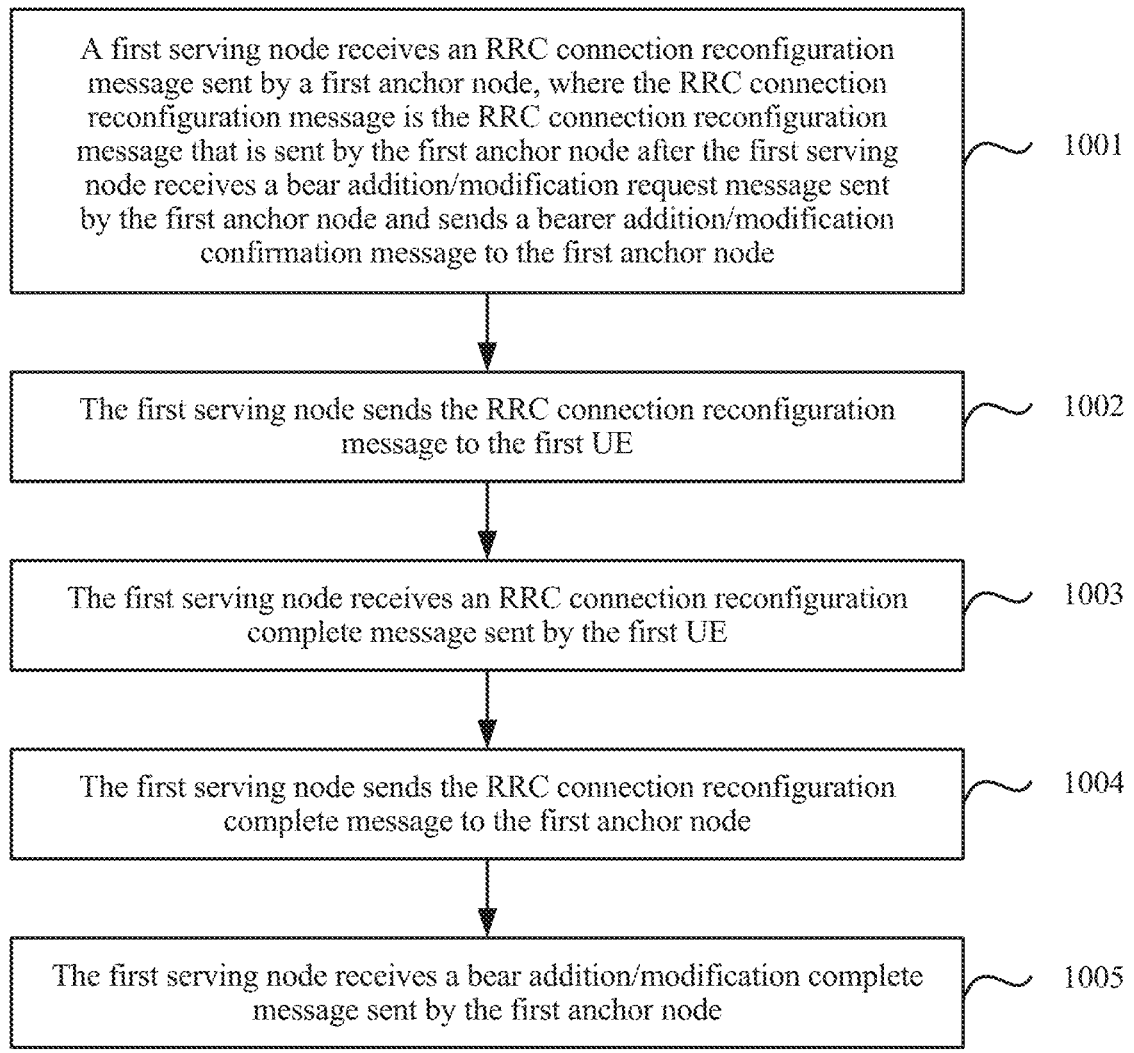
FIG. 10 is a flowchart of an RRC message processing method on a serving node side according to an embodiment of the present invention.

FIG. 10 is a flowchart of an RRC message processing method on a serving node side according to an embodiment of the present invention. The RRC message processing method is based on the network architecture shown in FIG. 1, and is specifically used for handover between serving nodes connected to an anchor node. The method is executed by a serving node. The RRC message includes an RRC message carried by an SRB1. The RRC message carried by the SRB1 is specifically an RRC connection reconfiguration message or an RRC connection reconfiguration complete message. As shown in FIG. 10, the method specifically includes the following steps.

Step 1001: A first serving node receives an RRC connection reconfiguration message sent by a first anchor node, where the RRC connection reconfiguration message is the RRC connection reconfiguration message that is sent by the first anchor node after the first serving node receives a bearer addition/modification request message sent by the first anchor node and sends a bearer addition/modification confirmation message to the first anchor node.

Second indication information may be carried when the RRC connection reconfiguration message is being sent. Specifically, the second indication information may be carried in the RRC connection reconfiguration message, or the second indication information may be carried in a control plane signaling message that carries the RRC connection reconfiguration message. Alternatively, the second indication information may be independently sent after the RRC connection reconfiguration message is sent, so that the first serving node identifies, according to the second indication information, that the RRC connection reconfiguration message is an RRC message carried by an SRB1. A first RLC layer entity of the first serving node processes the RRC message carried by the SRB1.

In this embodiment of the present invention, the first anchor node may send a bearer release request message to a second serving node before the first anchor node sends the RRC connection reconfiguration message to the first serving node. Alternatively, the first anchor node may send a bearer release request message to a second serving node after the first anchor node sends the RRC connection reconfiguration message to the first serving node. A sequence for sending the bearer release request message and sending the RRC connection reconfiguration message is not specifically limited in the present invention.

Step 1002: The first serving node sends the RRC connection reconfiguration message to first UE.

Specifically, the first RLC layer entity of the first serving node may process the RRC connection reconfiguration message and then send a processed message to the first UE by using a MAC layer and a physical layer.

Step 1003: The first serving node receives an RRC connection reconfiguration complete message sent by the first UE.

Step 1004: The first serving node sends the RRC connection reconfiguration complete message to the first anchor node.

The second indication information may be carried when the RRC connection reconfiguration complete message is being sent. Specifically, the second indication information may be carried in the RRC connection reconfiguration complete message, or the second indication information may be carried in a control plane signaling message that carries the RRC connection reconfiguration complete message. Alternatively, the second indication information may be independently sent after the RRC connection reconfiguration complete message is sent, so that the first anchor node identifies, according to the second indication information, that the RRC connection reconfiguration message is the RRC message carried by the SRB1. A first PDCP layer entity of the first anchor node processes the RRC message carried by the SRB1 and then sends a processed message to an RRC layer entity.

Step 1005: The first serving node receives a bear addition/modification complete message sent by the first anchor node.

It may be learned from the foregoing processing process that, in the RRC message processing method provided in this embodiment of the present invention, handover between serving nodes connected to an anchor node may be implemented. In addition, in a serving node handover process, for an RRC message between a first serving node and a first anchor node, indication information used to indicate an SRB type may be carried when the RRC message is being sent, or the indication information may be independently sent, so that the first serving node and the first anchor node perform corresponding processing. Therefore, an RRC function is separated to two nodes, namely, the first serving node and the first anchor node.

Figure 11:
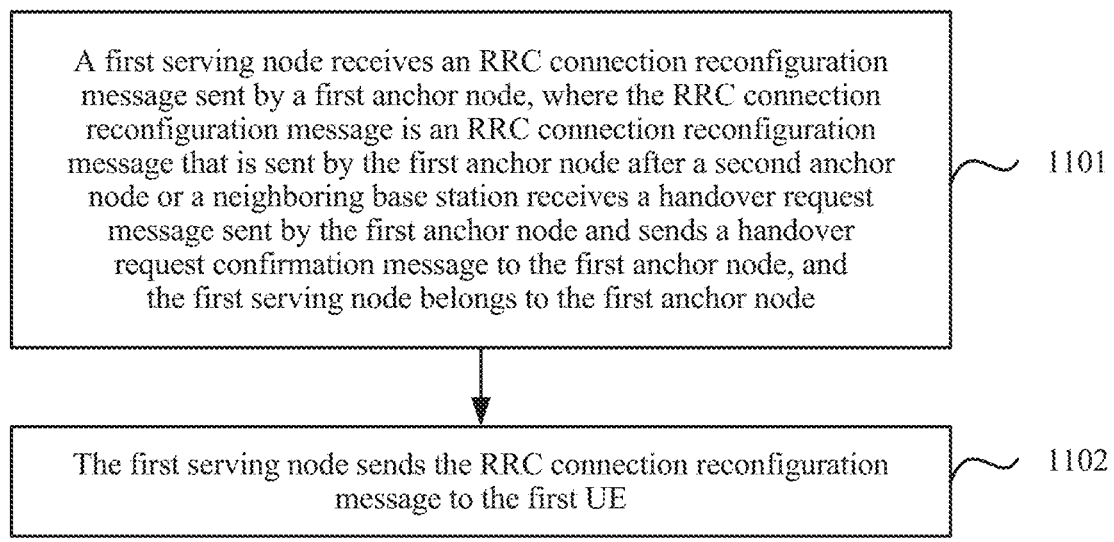
FIG. 11 is a flowchart of an RRC message processing method on a serving node side according to an embodiment of the present invention.

FIG. 11 is a flowchart of an RRC message processing method on a serving node side according to an embodiment of the present invention. The RRC message processing method is based on the network architecture shown in FIG. 1, and is specifically used for handover between serving nodes connected to anchor nodes. The method is executed by a serving node. The RRC message includes an RRC message carried by an SRB1. The RRC message carried by the SRB1 is specifically an RRC connection reconfiguration message. As shown in FIG. 11, the method specifically includes the following steps.

Step 1101: A first serving node receives an RRC connection reconfiguration message sent by a first anchor node, where the RRC connection reconfiguration message is an RRC connection reconfiguration message that is sent by the first anchor node after a second anchor node or a neighboring base station receives a handover request message sent by the first anchor node and sends a handover request confirmation message to the first anchor node, and the first serving node belongs to the first anchor node.

Second indication information may be carried when the RRC connection reconfiguration message is being sent. Specifically, the second indication information may be carried in the RRC connection reconfiguration message, or the second indication information may be carried in a control plane signaling message that carries the RRC connection reconfiguration message. Alternatively, the second indication information may be independently sent after the RRC connection reconfiguration message is sent, so that the first serving node identifies, according to the second indication information, that the RRC connection reconfiguration message is an RRC message carried by an SRB1. A first RLC layer entity of the first serving node processes the RRC connection reconfiguration message.

The neighboring base station is a base station that is established in a cell adjacent to a cell in which the first serving node is located. In this embodiment of the present invention, when a handover needs to be performed on the first anchor node, the handover may be performed from the first anchor node to the second anchor node or to the neighboring base station.

Step 1102: The first serving node sends the RRC connection reconfiguration message to first UE.

Specifically, the first RLC layer entity of the first serving node may process the RRC connection reconfiguration message and then send a processed message to the first UE by using a MAC layer and a physical layer.

In addition, after step 1102, the first anchor node may send a bearer release request message to the first serving node.

In this embodiment of the present invention, the following processing process may further be included: The second anchor node or the neighboring base station processes a random access process of the first UE; a second serving node or the neighboring base station receives an RRC connection reconfiguration complete message sent by the first UE; the second serving node sends the RRC connection reconfiguration complete message to the second anchor node; the first anchor node receives a UE context release request message sent by the second anchor node or the neighboring base station.

The second indication information may be carried when the RRC connection reconfiguration complete message is being sent. Specifically, the second indication information may be carried in the RRC connection reconfiguration complete message, or the second indication information may be carried in a control plane signaling message that carries the RRC connection reconfiguration complete message. Alternatively, the second indication information may be independently sent after the RRC connection reconfiguration complete message is sent, so that the second anchor node identifies, according to the second indication information, that the RRC connection reconfiguration complete message is the RRC message carried by the SRB1. A first PDCP layer entity of the second anchor node processes the RRC message carried by the SRB1 and then sends a processed message to an RRC layer entity.

It may be learned from the foregoing processing process that, in the RRC message processing method provided in this embodiment of the present invention, handover between serving nodes connected to anchor nodes may be implemented. In addition, in a serving node handover process, for an RRC message between a first serving node and a first anchor node, indication information used to indicate an SRB type may be carried when the RRC message is being sent, or the indication information may be independently sent, so that the first serving node and the first anchor node perform corresponding processing. Therefore, an RRC function is separated to two nodes, namely, the first serving node and the first anchor node.

Figure 12:
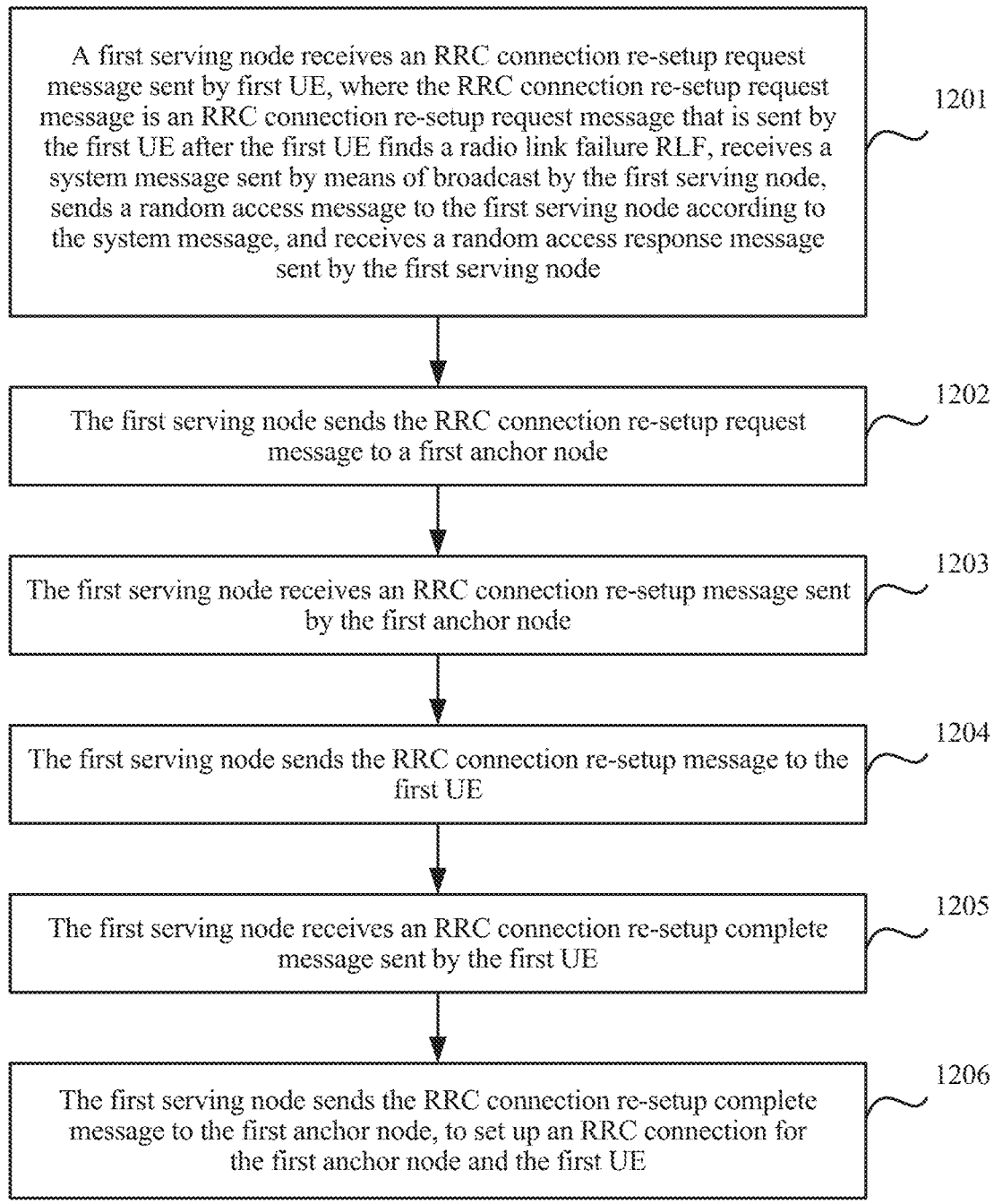
FIG. 12 is a flowchart of an RRC message processing method on a serving node side according to an embodiment of the present invention.

FIG. 12 is a flowchart of an RRC message processing method on a serving node side according to an embodiment of the present invention. The RRC message processing method is based on the network architecture shown in FIG. 1, and is specifically used for RRC connection re-setup after a radio link failure occurs. The method is executed by a serving node. The RRC message includes an RRC message carried by an SRB0 and an RRC message carried by an SRB1. The RRC message carried by the SRB0 is specifically an RRC connection re-setup request message or an RRC connection re-setup message. The RRC message carried by the SRB1 is specifically an RRC connection re-setup complete message. As shown in FIG. 12, the method specifically includes the following steps.

Step 1201: A first serving node receives an RRC connection re-setup request message sent by first UE, where the RRC connection re-setup request message is an RRC connection re-setup request message that is sent by the first UE after the first UE finds a radio link failure RLF, receives a system message sent by means of broadcast by the first serving node, sends a random access message to the first serving node according to the system message, and receives a random access response message sent by the first serving node.

Step 1202: The first serving node sends the RRC connection re-setup request message to a first anchor node.

In this embodiment of the present invention, the first serving node may add first indication information to a message when sending the RRC connection re-setup request message to the first anchor node, and specifically, may add the first indication information to the RRC connection re-setup request message or add the first indication information to a control plane signaling message that carries the RRC connection re-setup request message. Alternatively, the first serving node may independently send the first indication information after sending the RRC connection re-setup request message. The first indication information is used to indicate that the RRC connection re-setup request message is an RRC message carried by an SRB0. The first indication information may be an explicit signaling indication or a particular message name. The latter is, for example, SRB0RRCTransfer or InitialRRCTransfer. Therefore, after identifying, according to the first indication information, that the RRC connection re-setup request message is the RRC message carried by the SRB0, the first anchor node directly delivers the message to an RRC layer entity for processing.

Step 1203: The first serving node receives an RRC connection re-setup message sent by the first anchor node.

In this embodiment of the present invention, the first anchor node may add the first indication information to a message when sending the RRC connection re-setup message to the first serving node, and specifically, may add the first indication information to the RRC connection re-setup message or add the first indication information to a control plane signaling message that carries the RRC connection re-setup message. Alternatively, the first anchor node may independently send the first indication information after sending the RRC connection re-setup message, so that the first serving node identifies, according to the first indication information, that the RRC connection setup message is the RRC message carried by the SRB0.

Step 1204: The first serving node sends the RRC connection re-setup message to the first UE.

Step 1205: The first serving node receives an RRC connection re-setup complete message sent by the first UE.

In this embodiment of the present invention, the first serving node has a first RLC layer entity used to process an RRC message carried by an SRB1 and a second RLC layer entity used to process an RRC message carried by an SRB2. Because the RRC connection re-setup complete message is the RRC message carried by the SRB1, the first RLC layer entity of the first serving node processes the RRC connection re-setup complete message and then sends a processed message to the first UE.

Step 1206: The first serving node sends the RRC connection re-setup complete message to the first anchor node, to set up an RRC connection for the first anchor node and the first UE.

The first serving node may further send second indication information when sending the RRC connection re-setup complete message to the first anchor node, so that the first anchor node identifies, according to the second indication information, that the RRC connection re-setup complete message is the RRC message carried by the SRB1. Then, a first PDCP layer entity of the first anchor node processes the RRC connection re-setup complete message and then sends a processed message to the RRC layer entity.

It may be learned from the foregoing processing process that, in the RRC message processing method provided in this embodiment of the present invention, RRC connection re-setup may be implemented after a radio link failure occurs. In addition, in an RRC connection re-setup process, for an RRC message between a first serving node and a first anchor node, indication information used to indicate an SRB type may be carried when the RRC message is being sent, or the indication information may be independently sent, so that the first serving node and the first anchor node perform corresponding processing. Therefore, an RRC function is separated to two nodes, namely, the first serving node and the first anchor node.

Figure 13:
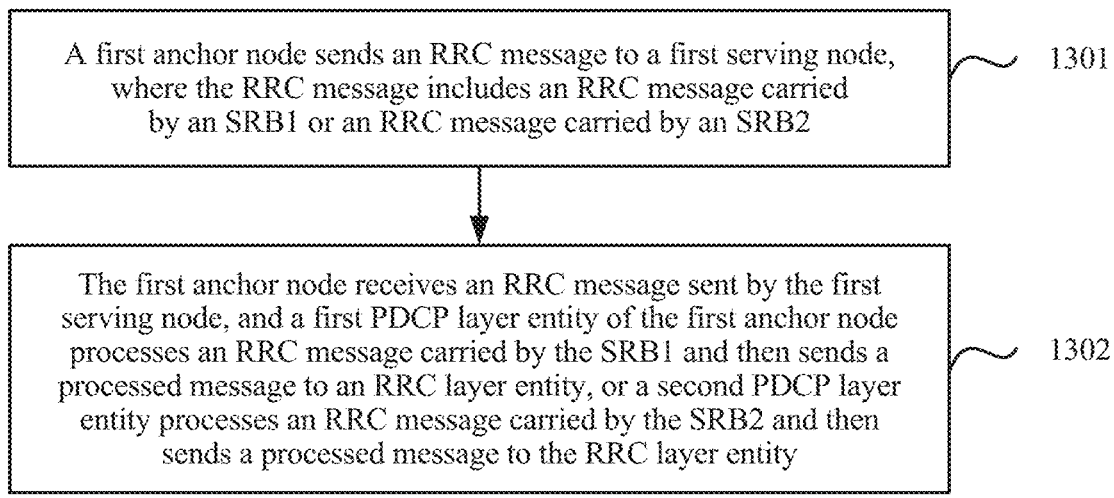
FIG. 13 is a flowchart of an RRC message processing method on an anchor node side according to an embodiment of the present invention.

FIG. 13 is a flowchart of an RRC message processing method on an anchor node side according to an embodiment of the present invention. The RRC message processing method is based on the network architecture shown in FIG. 1. The method is executed by an anchor node. As shown in FIG. 13, the method specifically includes the following steps.

Step 1301: A first anchor node sends an RRC message to a first serving node, where the RRC message includes an RRC message carried by an SRB1 or an RRC message carried by an SRB2.

The first anchor node has an RRC function corresponding to the SRB1 and an RRC function corresponding to the SRB2.

Step 1302. The first anchor node receives an RRC message sent by the first serving node, and a first PDCP layer entity of the first anchor node processes an RRC message carried by the SRB1 and then sends a processed message to an RRC layer entity, or a second PDCP layer entity processes an RRC message carried by the SRB2 and then sends a processed message to the RRC layer entity.

The RRC message may further include an RRC message carried by an SRB0. The method may further include: receiving, by the first anchor node, first indication information sent by the first serving node, where the first indication information is used by the first anchor node to identify, according to the first indication information, that the RRC message is the RRC message carried by the SRB0, and to perform processing by using the RRC layer entity of the first anchor node; or sending, by the first anchor node, first indication information to the first serving node, where the first indication information is used by the first serving node to identify, according to the first indication information, that the RRC message is the RRC message carried by the SRB0, and to perform processing by using an RRC layer entity of the first serving node.

The method may further include: receiving, by the first anchor node, second indication information sent by the first serving node, where the second indication information is used by the first anchor node to identify, according to the second indication information, that the RRC message is the RRC message carried by the SRB1; or sending, by the first anchor node, second indication information to the first serving node, where the second indication information is used by the first serving node to identify, according to the second indication information, that the RRC message is the RRC message carried by the SRB1.

The method may further include: receiving, by the first anchor node, third indication information sent by the first serving node, where the third indication information is used by the first anchor node to identify, according to the third indication information, that the RRC message is the RRC message carried by the SRB2; or sending, by the first anchor node, third indication information to the first serving node, where the third indication information is used by the first serving node to identify, according to the third indication information, that the RRC message is the RRC message carried by the SRB2.

It may be learned from the foregoing processing process that, in the RRC message processing method provided in this embodiment of the present invention, an RRC message cannot be directly sent between first UE and a first anchor node, and needs to be forwarded by a first serving node. That is, when the first UE needs to send an RRC message to the first anchor node, the first UE first needs to send the RRC message to the first serving node, and then the first serving node sends the RRC message to the first anchor node. When the first anchor node needs to send an RRC message to the first UE, the first anchor node first needs to send the RRC message to the first serving node, and then the first serving node sends the RRC message to the first UE. Because the RRC message needs to pass through two nodes, namely, the first anchor node and the first serving node, an RRC function can be separated to two nodes by using the method provided in Embodiment 1 of the present invention.

Figure 14:
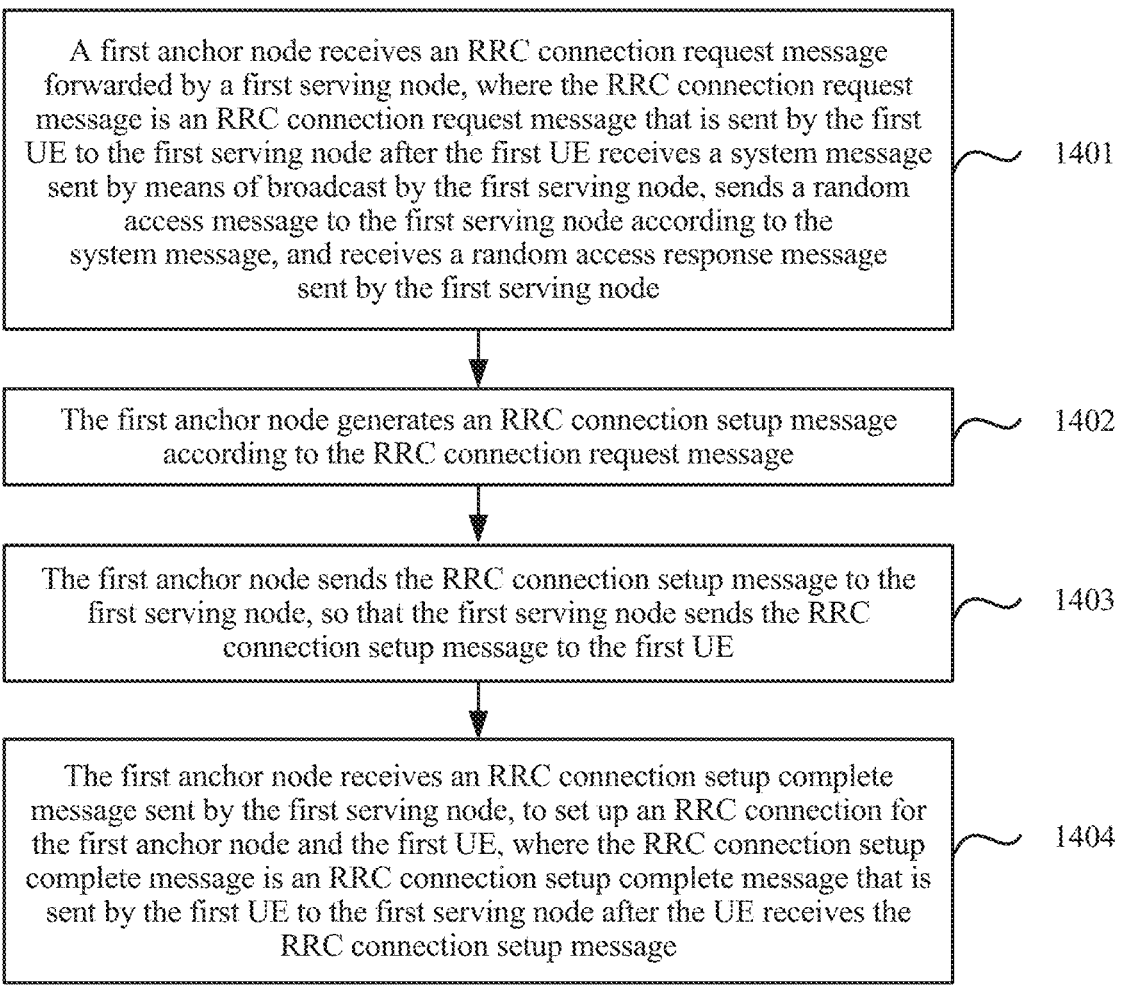
FIG. 14 is a flowchart of an RRC message processing method on an anchor node side according to an embodiment of the present invention.

FIG. 14 is a flowchart of an RRC message processing method on an anchor node side according to an embodiment of the present invention. The RRC message processing method is based on the network architecture shown in FIG. 1, and is specifically used to set up an RRC connection. The method is executed by an anchor node. The RRC message includes an RRC message carried by an SRB1, an RRC message carried by an SRB2, and an RRC message carried by an SRB0. The RRC message carried by the SRB0 is specifically an RRC connection request message or an RRC connection setup message. The RRC message carried by the SRB1 is specifically an RRC connection setup complete message. As shown in FIG. 14, the method specifically includes the following steps.

Step 1401: A first anchor node receives an RRC connection request message forwarded by a first serving node, where the RRC connection request message is an RRC connection request message that is sent by the first UE to the first serving node after the first UE receives a system message sent by means of broadcast by the first serving node, sends a random access message to the first serving node according to the system message, and receives a random access response message sent by the first serving node.

Step 1402: The first anchor node generates an RRC connection setup message according to the RRC connection request message.

Step 1403: The first anchor node sends the RRC connection setup message to the first serving node, so that the first serving node sends the RRC connection setup message to the first UE.

Step 1404: The first anchor node receives an RRC connection setup complete message sent by the first serving node, to set up an RRC connection for the first anchor node and the first UE, where the RRC connection setup complete message is an RRC connection setup complete message that is sent by the first UE to the first serving node after the first UE receives the RRC connection setup message.

It may be learned from the foregoing processing process that, in the RRC message processing method provided in this embodiment of the present invention, an RRC connection may be set up for a first anchor node and first UE. In addition, in a process of setting up the RRC connection, for an RRC message between a first serving node and the first anchor node, indication information used to indicate an SRB type may be carried when the RRC message is being sent, or the indication information may be independently sent, so that the first serving node and the first anchor node perform corresponding processing. Therefore, an RRC function is separated to two nodes, namely, the first serving node and the first anchor node.

Figure 15:
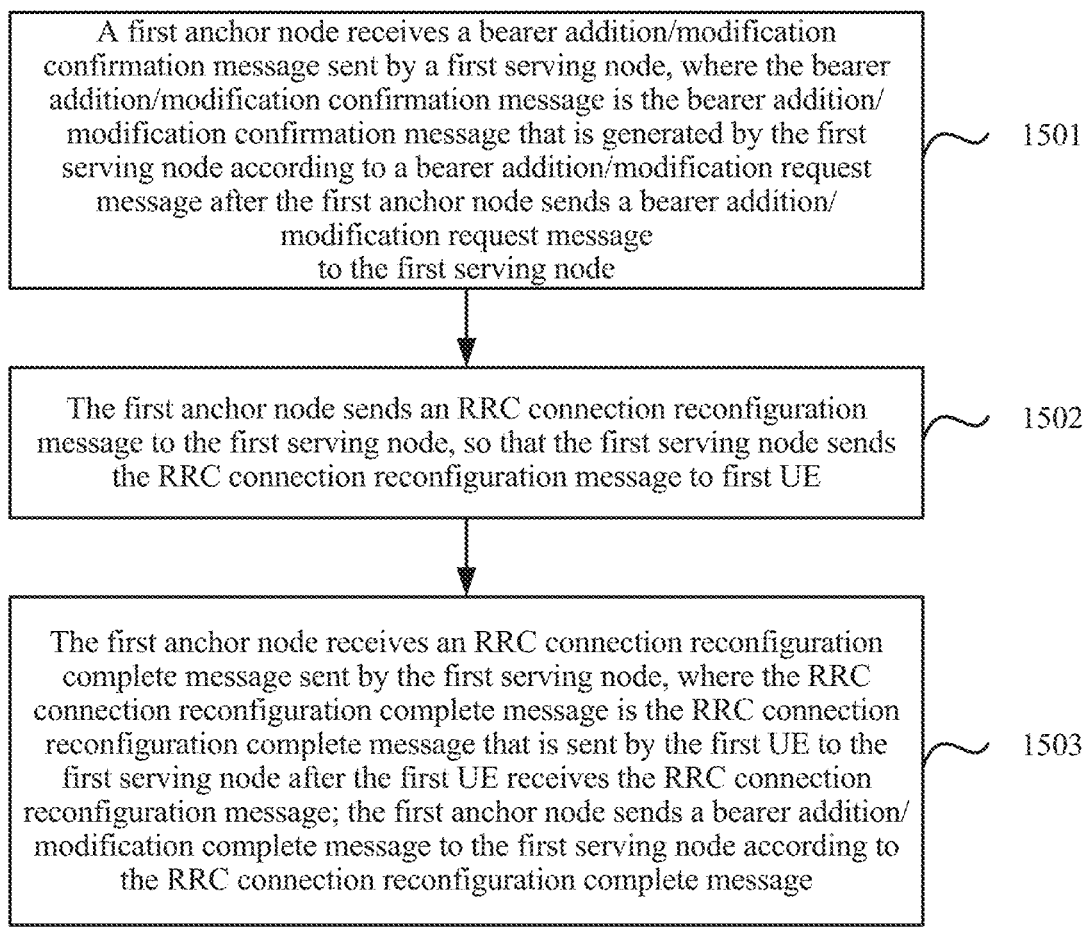
FIG. 15 is a flowchart of an RRC message processing method on an anchor node side according to an embodiment of the present invention.

FIG. 15 is a flowchart of an RRC message processing method on an anchor node side according to an embodiment of the present invention. The RRC message processing method is based on the network architecture shown in FIG. 1, and is specifically used to set up a DRB bearer. The method is executed by an anchor node. The RRC message includes an RRC message carried by an SRB1. The RRC message carried by the SRB1 is specifically an RRC connection reconfiguration message or an RRC connection reconfiguration complete message. As shown in FIG. 15, the method specifically includes the following steps.

Step 1501: A first anchor node receives a bearer addition/modification confirmation message sent by a first serving node, where the bearer addition/modification confirmation message is the bearer addition/modification confirmation message that is generated by the first serving node according to a bearer addition/modification request message after the first anchor node sends the bearer addition/modification request message to the first serving node.

Step 1502: The first anchor node sends an RRC connection reconfiguration message to the first serving node, so that the first serving node sends the RRC connection reconfiguration message to first UE.

Step 1503: The first anchor node receives an RRC connection reconfiguration complete message sent by the first serving node, where the RRC connection reconfiguration complete message is the RRC connection reconfiguration complete message that is sent by the first UE to the first serving node after the first UE receives the RRC connection reconfiguration message; the first anchor node sends a bearer addition/modification complete message to the first serving node according to the RRC connection reconfiguration complete message.

It may be learned from the foregoing processing process that, in the RRC message processing method provided in this embodiment of the present invention, a DRB bearer may be set up. In addition, in a process of setting up the DRB bearer, for an RRC message between a first serving node and a first anchor node, indication information used to indicate an SRB type may be carried when the RRC message is being sent, or the indication information may be independently sent, so that the first serving node and the first anchor node perform corresponding processing. Therefore, an RRC function is separated to two nodes, namely, the first serving node and the first anchor node.

Figure 16:
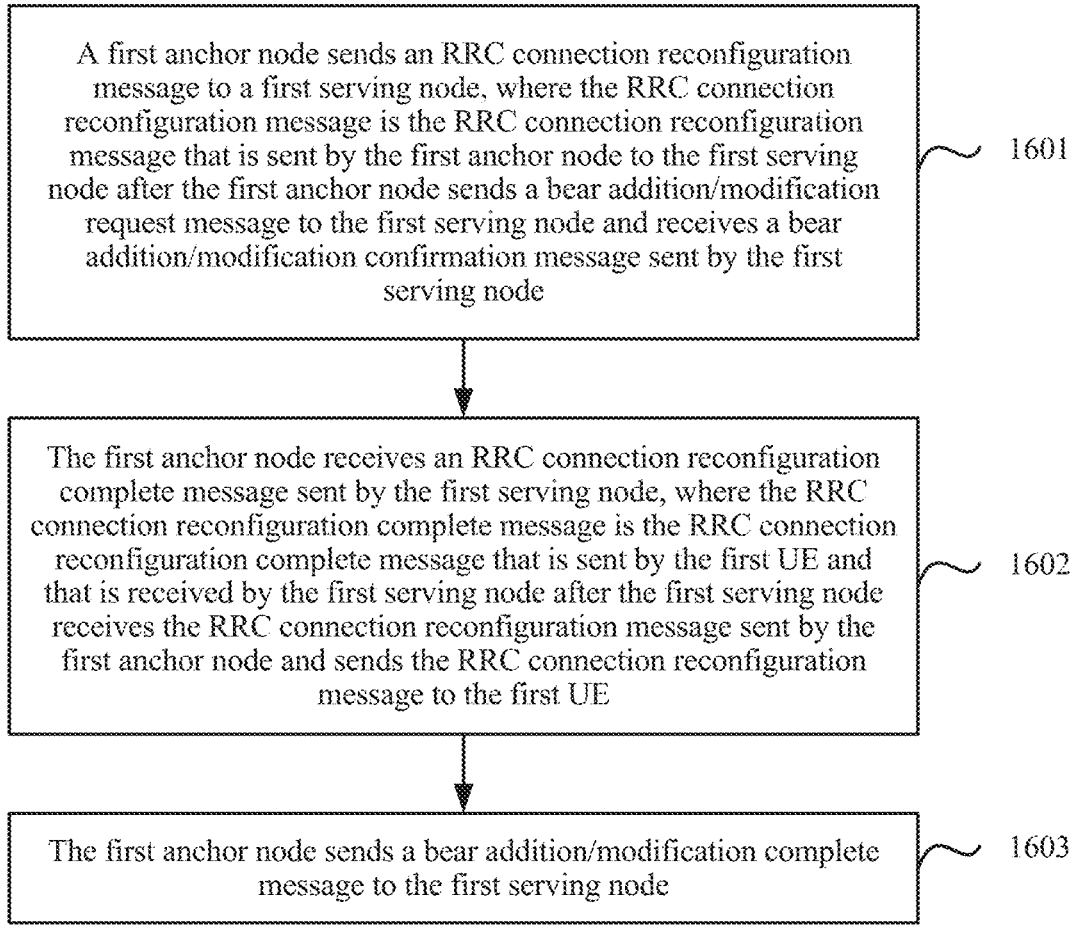
FIG. 16 is a flowchart of an RRC message processing method on an anchor node side according to an embodiment of the present invention.

FIG. 16 is a flowchart of an RRC message processing method on an anchor node side according to an embodiment of the present invention. The RRC message processing method is based on the network architecture shown in FIG. 1, and is specifically used for handover between serving nodes connected to an anchor node. The method is executed by an anchor node. The RRC message includes an RRC message carried by an SRB1. The RRC message carried by the SRB1 is specifically an RRC connection reconfiguration message or an RRC connection reconfiguration complete message. As shown in FIG. 16, the method specifically includes the following steps.

Step 1601: A first anchor node sends an RRC connection reconfiguration message to a first serving node, where the RRC connection reconfiguration message is the RRC connection reconfiguration message that is sent by the first anchor node to the first serving node after the first anchor node sends a bearer addition/modification request message to the first serving node and receives a bearer addition/modification confirmation message sent by the first serving node.

Step 1602: The first anchor node receives an RRC connection reconfiguration complete message sent by the first serving node, where the RRC connection reconfiguration complete message is the RRC connection reconfiguration complete message that is sent by the first UE and that is received by the first serving node after the first serving node receives the RRC connection reconfiguration message sent by the first anchor node and sends the RRC connection reconfiguration message to the first UE.

Step 1603: The first anchor node sends a bear addition/modification complete message to the first serving node.

It may be learned from the foregoing processing process that, in the RRC message processing method provided in this embodiment of the present invention, handover between serving nodes connected to an anchor node may be implemented. In addition, in a serving node handover process, for an RRC message between a first serving node and a first anchor node, indication information used to indicate an SRB type may be carried when the RRC message is being sent, or the indication information may be independently sent, so that the first serving node and the first anchor node perform corresponding processing. Therefore, an RRC function is separated to two nodes, namely, the first serving node and the first anchor node.

Figure 17:
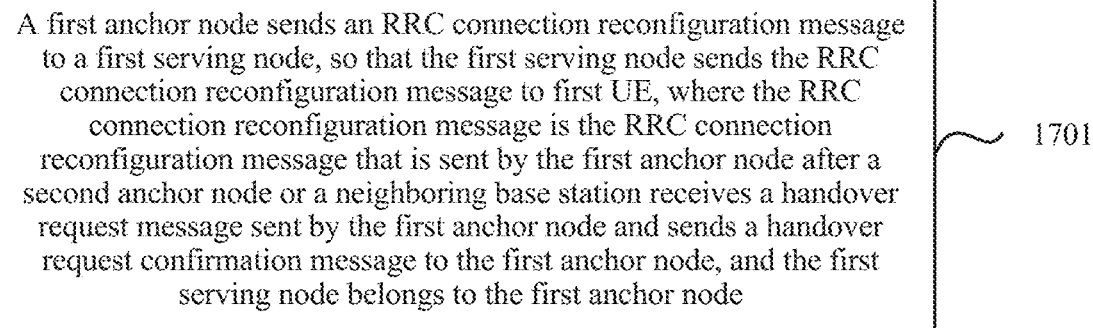
FIG. 17 is a flowchart of an RRC message processing method on an anchor node side according to an embodiment of the present invention.

FIG. 17 is a flowchart of an RRC message processing method on an anchor node side according to an embodiment of the present invention. The RRC message processing method is based on the network architecture shown in FIG. 1, and is specifically used for handover between serving nodes connected to anchor nodes. The method is executed by an anchor node. The RRC message includes an RRC message carried by an SRB1. The RRC message carried by the SRB1 is specifically an RRC connection reconfiguration message. As shown in FIG. 12, the method specifically includes the following step.

Step 1701: A first anchor node sends an RRC connection reconfiguration message to a first serving node, so that the first serving node sends the RRC connection reconfiguration message to first UE, where the RRC connection reconfiguration message is the RRC connection reconfiguration message that is sent by the first anchor node after a second anchor node or a neighboring base station receives a handover request message sent by the first anchor node and sends a handover request confirmation message to the first anchor node, and the first serving node belongs to the first anchor node.

It may be learned from the foregoing processing process that, in the RRC message processing method provided in this embodiment of the present invention, handover between serving nodes connected to anchor nodes may be implemented. In addition, in a serving node handover process, for an RRC message between a first serving node and a first anchor node, indication information used to indicate an SRB type may be carried when the RRC message is being sent, or the indication information may be independently sent, so that the first serving node and the first anchor node perform corresponding processing. Therefore, an RRC function is separated to two nodes, namely, the first serving node and the first anchor node.

Figure 18:
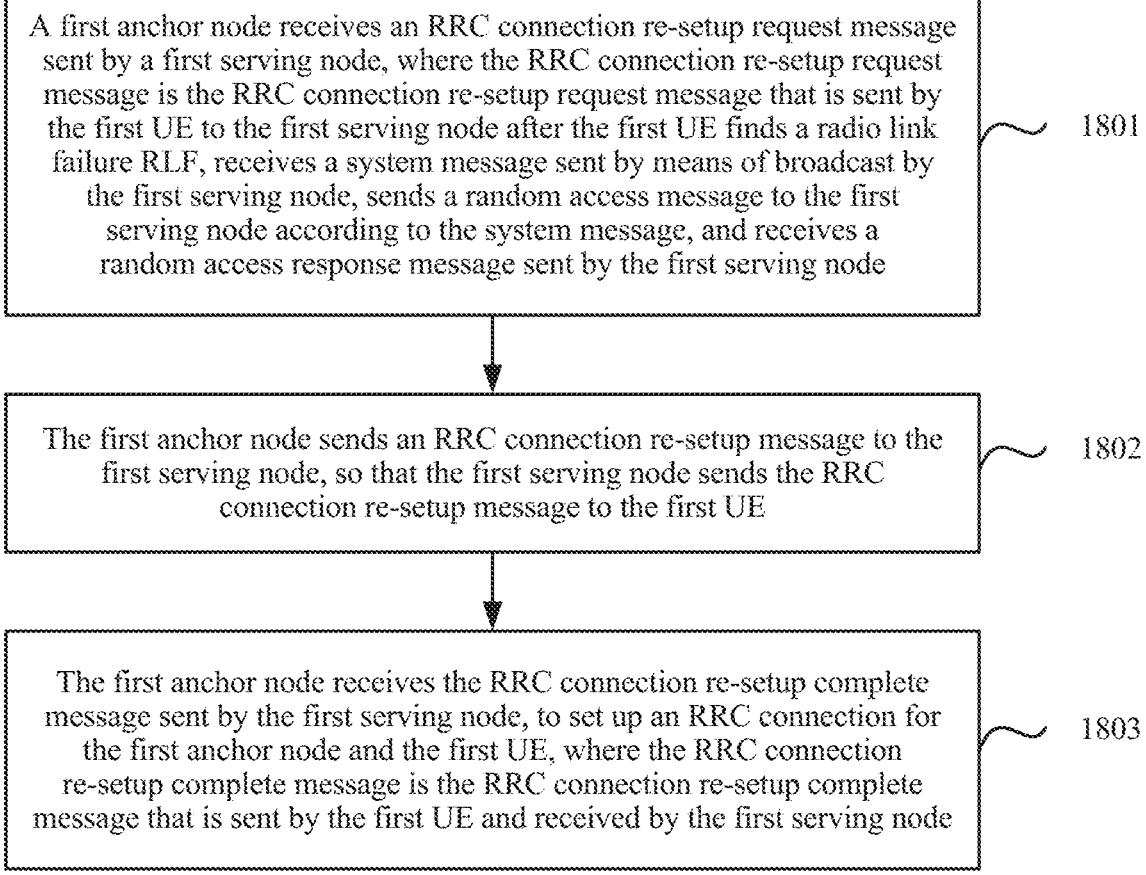
FIG. 18 is a flowchart of an RRC message processing method on an anchor node side according to an embodiment of the present invention.

FIG. 18 is a flowchart of an RRC message processing method on an anchor node side according to an embodiment of the present invention. The RRC message processing method is based on the network architecture shown in FIG. 1, and is specifically used for RRC connection re-setup after a radio link failure occurs. The method is executed by an anchor node. The RRC message includes an RRC message carried by an SRB0 and an RRC message carried by an SRB1. The RRC message carried by the SRB0 is specifically an RRC connection re-setup request message or an RRC connection re-setup message. The RRC message carried by the SRB1 is specifically an RRC connection re-setup complete message. As shown in FIG. 18, the method specifically includes the following steps.

Step 1801: A first anchor node receives an RRC connection re-setup request message sent by a first serving node, where the RRC connection re-setup request message is the RRC connection re-setup request message that is sent by the first UE to the first serving node after the first UE finds a radio link failure RLF, receives a system message sent by means of broadcast by the first serving node, sends a random access message to the first serving node according to the system message, and receives a random access response message sent by the first serving node.

Step 1802: The first anchor node sends an RRC connection re-setup message to the first serving node, so that the first serving node sends the RRC connection re-setup message to the first UE.

Step 1803: The first anchor node receives an RRC connection re-setup complete message sent by the first serving node, to set up an RRC connection for the first anchor node and the first UE, where the RRC connection re-setup complete message is the RRC connection re-setup complete message that is sent by the first UE and received by the first serving node.

It may be learned from the foregoing processing process that, in the RRC message processing method provided in this embodiment of the present invention, RRC connection re-setup may be implemented after a radio link failure occurs. In addition, in an RRC connection re-setup process, for an RRC message between a first serving node and a first anchor node, indication information used to indicate an SRB type may be carried when the RRC message is being sent, or the indication information may be independently sent, so that the first serving node and the first anchor node perform corresponding processing. Therefore, an RRC function is separated to two nodes, namely, the first serving node and the first anchor node.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A system for processing a radio resource control (RRC) message, the system comprising:
   a serving node; and
   an anchor node, wherein the serving node and the anchor node are connected;
   wherein the serving node is configured to:
      receive a first radio resource control (RRC) message via an established signaling radio bearer (SRB) from a user equipment (UE); and
      send the first RRC message and first indication information to the anchor node, wherein the first indication information identifies the established SRB.

2. The system according to claim 1, wherein the SRB that carries the first RRC message is SRB 0, SRB 1, or SRB 2.

3. The system according to claim 2, wherein the anchor node is configured to:
   send a second RRC message and second indication information to the serving node, wherein the second indication information identifies a second SRB that carries the second RRC message from the anchor node.

4. The system according to claim 3, wherein the second SRB that carries the second RRC message is SRB 0, SRB 1, or SRB 2.

5. The system according to claim 3, wherein the second RRC message is carried by SRB 1 or SRB 2, and the serving node is configured to:
   obtain a processed message by processing, by a Radio Link Control (RLC) layer entity of the serving node, the second RRC message carried by the SRB 1 or the SRB 2; and
   send the processed message to the UE.

6. The system according to claim 1, wherein the first RRC message is carried by SRB 1 or SRB 2, and the anchor node is configured to:
   obtain a processed message by processing, by a Packet Data Convergence Protocol (PDCP) layer entity of the anchor node and an RRC layer of the anchor node, the first RRC message carried by the SRB 1 or the SRB 2; and
   send the processed message to the serving node.

7. The system according to claim 3, wherein the second RRC message is one message of an RRC connection setup message carried by an SRB 0, an RRC connection reestablishment message carried by the SRB 0, or an RRC connection reconfiguration message carried by SRB 1, and the serving node is configured to:
   send the second RRC message to the UE.

8. The system according to claim 1, wherein the first RRC message from the UE is one message of an RRC connection reestablishment complete message carried by SRB 1, an RRC connection reconfiguration complete message carried by SRB 1, or an RRC connection setup complete message carried by SRB 1, and the serving node is configured to:
   send the first RRC message to the anchor node.

9. A method for processing a radio resource control (RRC) message in a communication system, the communication system comprising: a serving node and an anchor node, wherein the serving node and the anchor node are connected, the method comprising:
   receiving, by the serving node, a first radio resource control (RRC) message via an established signaling radio bearer (SRB) from a user equipment (UE); and
   sending, by the serving node, the first RRC message and first indication information to the anchor node, wherein the first indication information identifies the established SRB.

10. The method according to claim 9, wherein the SRB that carries the first RRC message is SRB 0, SRB 1, or SRB 2.

11. The method according to claim 10, wherein the method further comprise:
   sending, by the anchor node, a second RRC message and second indication information to the serving node, the second indication information identifies a second SRB that carries the second RRC message from the anchor node.

12. The method according to claim 11, wherein the second SRB that carries the second RRC message is SRB 0, SRB 1, or SRB 2.

13. The method according to claim 11, wherein the second RRC message is carried by SRB 1 or SRB 2, and the method further comprises:
obtaining a processed message by processing, by a Radio Link Control (RLC) layer entity of the serving node, the second RRC message carried by the SRB 1 or the SRB 2; and
sending, by the serving node, the processed message to the UE.

14. The method according to claim 9, wherein the first RRC message is carried by SRB 1 or SRB 2, and the method further comprises:
obtaining a processed message by processing, by a Packet Data Convergence Protocol (PDCP) layer entity of the anchor node and an RRC layer of the anchor node, the first RRC message carried by the SRB 1 or the SRB 2; and
sending, by the anchor node, the processed message to the serving node.

15. The method according to claim 11, wherein the second RRC message is one message of an RRC connection setup message carried by an SRB 0, an RRC connection reestablishment message carried by the SRB or an RRC connection reconfiguration message carried by SRB 1, and the method further comprises:
sending, by the serving node, the second RRC message to the UE.

16. The method according to claim 9, wherein the first RRC message from the UE is one message of an RRC connection reestablishment complete message carried by SRB 1, an RRC connection reconfiguration complete message carried by SRB 1, or an RRC connection setup complete message carried by SRB 1, and the method further comprises:
sending, by the serving node, the first RRC message to the anchor node.

* * * * *

UNITED STATES PATENT AND TRADEMARK OFFICE
CERTIFICATE OF CORRECTION

PATENT NO. : 11,758,609 B2
APPLICATION NO. : 17/369503
DATED : September 12, 2023
INVENTOR(S) : Bo Lin Page 1 of 1

It is certified that error appears in the above-identified patent and that said Letters Patent is hereby corrected as shown below:

In the Claims

Column 46, Line 6 (Approx.), Claim 15, please delete "SRB", and insert therefore -- SRB 0, --.

Signed and Sealed this
Twenty-third Day of April, 2024

Katherine Kelly Vidal
*Director of the United States Patent and Trademark Office*